United States Patent [19]

Soga et al.

[11] Patent Number: 4,967,621

[45] Date of Patent: Nov. 6, 1990

[54] HYDRAULIC CONTROL DEVICE FOR BELT-AND-PULLEY TYPE CONTINUOUSLY VARIABLE TRANSMISSION FOR A VEHICLE

[75] Inventors: Yoshinobu Soga; Masami Sugaya; Katsumi Kouno, all of Susono; Susumu Okawa, Aichi, all of Japan

[73] Assignee: Toyota Jidosha Kabushiki Kaisha, Japan

[21] Appl. No.: 443,845

[22] Filed: Dec. 4, 1989

Related U.S. Application Data

[63] Continuation of Ser. No. 233,250, Aug. 16, 1988, abandoned.

[30] Foreign Application Priority Data

| Aug. 21, 1987 | [JP] | Japan | 62-208781 |
| Aug. 21, 1987 | [JP] | Japan | 62-208786 |
| Aug. 21, 1987 | [JP] | Japan | 62-208787 |
| Aug. 21, 1987 | [JP] | Japan | 62-208788 |
| Aug. 21, 1987 | [JP] | Japan | 62-208789 |
| Aug. 21, 1987 | [JP] | Japan | 62-208793 |
| Aug. 21, 1987 | [JP] | Japan | 62-208794 |
| Aug. 21, 1987 | [JP] | Japan | 62-127759 |

[51] Int. Cl.⁵ .......................... B60K 41/18
[52] U.S. Cl. .......................... 74/867; 74/868
[58] Field of Search .................. 74/866, 867, 868, 869

[56] References Cited

U.S. PATENT DOCUMENTS

| 4,547,178 | 10/1985 | Hayakwaa et al. | 474/11 |
| 4,557,706 | 12/1985 | Tanaka et al. | 474/28 |
| 4,565,110 | 1/1986 | Ito | 74/868 |
| 4,628,773 | 12/1986 | Itoh et al. | 74/868 X |
| 4,653,353 | 3/1987 | Itoh et al. | 74/868 |
| 4,682,519 | 7/1987 | Okada et al. | 74/867 X |
| 4,699,604 | 10/1987 | Yokoyama | 74/868 X |
| 4,751,859 | 6/1988 | Itoh et al. | 74/867 X |
| 4,772,249 | 9/1988 | Kouno et al. | 74/868 X |
| 4,778,435 | 10/1988 | Sugaya et al. | 474/28 |
| 4,785,690 | 11/1988 | Yokoyama et al. | 74/867 |

FOREIGN PATENT DOCUMENTS

| 243539 | 12/1989 | European Pat. Off. |
| 52-98861 | 2/1977 | Japan |
| 58-29424 | 8/1986 | Japan |

Primary Examiner—Dirk Wright
Attorney, Agent, or Firm—Oliff & Berridge

[57] ABSTRACT

A hydraulic control device for controlling a belt-and-pulley type continuously variable transmission for a motor vehicle which has two variable-diameter pulleys connected by a belt, and two hydraulic actuators for changing effective diameters of the pulleys. The hydraulic control device includes a first and a second pressure regulating valve for adjusting a pressure of a fluid supplied from a hydraulic power source, respectively to a first line pressure and a second line pressure lower than the first line pressure, and a CVT shift control valve device for controlling a speed ratio of the transmission. The valve device includes a shift-direction switching directional control valve and a shift-speed control flow control valve. The directional control valve is operable between a first position in which one of the hydraulic actuators communicates with a first pressure line having the first line pressure, while the other actuator communicates with an atmosphere or a second pressure line having a second line pressure, and a second position in which the above-indicated one actuator communicates with the atmosphere or second pressure line while the other actuator communicates with the first pressure line. The flow control valve controls rates of flows of the fluid to and from the actuators, in response to an operation of the directional control valve.

30 Claims, 13 Drawing Sheets

FIG. 8
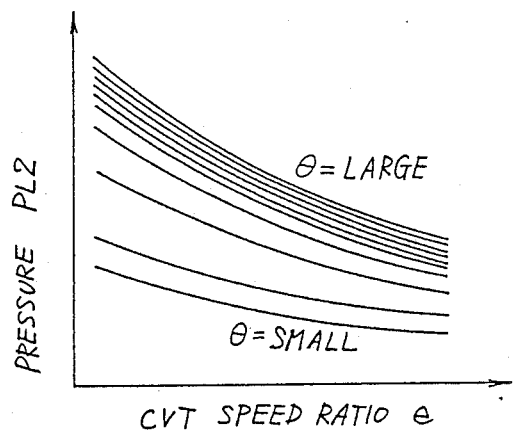
FIG. 10
| 1ST SOL. VALVE 272 | 2ND SOL. VALVE 290 | SHIFT MOTIONS OF CVT 16 |
|---|---|---|
| ON | OFF | SLOW SHIFT-UP |
| ON | DUTY CYCLE | INTERMEDIATE SHIFT-UP |
| ON | ON | FAST SHIFT-UP |
| OFF | OFF | SLOW SHIFT-DOWN |
| OFF | DUTY CYCLE | INTERMEDIATE SHIFT-DOWN |
| OFF | ON | FAST SHIFT-DOWN |
FIG. 11
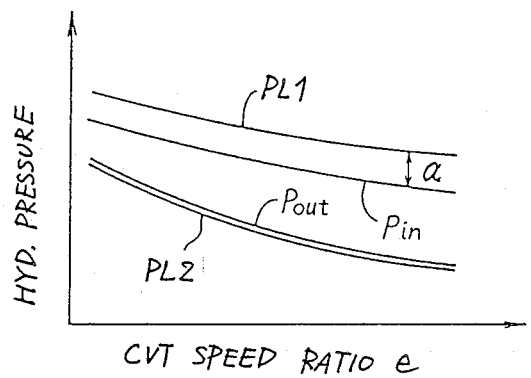

S5a: TURNING ON SOL. VALVE 272

HYDRAULIC CONTROL DEVICE FOR BELT-AND-PULLEY TYPE CONTINUOUSLY VARIABLE TRANSMISSION FOR A VEHICLE

This is a Continuation of application Ser. No. 07/233,250 filed Aug. 16, 1988 abandoned.

BACKGROUND OF THE INVENTION

1. Field of the Invention

The present invention relates to improvements in a hydraulic control device for controlling a hydraulically operated continuously variable transmission of a belt-and-pulley type for an automotive vehicle.

2. Discussion of the Prior Art

There is known a belt-and-pulley type continuously variable transmission for a motor vehicle which includes a pair of variable-diameter pulleys provided on a first and a second rotating shaft, respectively, a transmission belt which connects the pair of pulleys to transmit power from one of the first and second shafts to the other, and a first and a second hydraulic cylinder for changing effective diameters of the respective variable-diameter pulleys. A hydraulic control device for controlling such a belt-and-pulley type continuously variable transmission is known, for example, according to laid-open Publication No. 52-98861 (published in 1977) of unexamined Japanese Patent Application, in which the tension of the transmission belt is controlled primarily by regulating a pressure of a working fluid which is applied to the second hydraulic cylinder (provided on the driven shaft), while the speed ratio of the transmission is controlled primarily by regulating a rate of flow of the fluid into or from the first hydraulic cylinder (provided on the drive shaft).

In the hydraulic control device indicated above, however, a single line pressure produced in relation to the actual speed ratio of the transmission is directly applied to the second hydraulic cylinder for controlling the belt tension, and is indirectly applied to the first hydraulic cylinder via a flow control valve for controlling the speed ratio of the transmission. According to this arrangement, the area of the pressure receiving surface of the first hydraulic cylinder should be larger than that of the second hydraulic cyinder, in order to feed the fluid into the first hydraulic cylinder and thereby cause the effective diameter of this first cylinder to be larger than that of the second cylinder, so that the speed ratio of the transmission may be varied over a sufficiently wide range. The belt-and-pulley continuously variable transmission of this type therefore tends to have relatively large external dimensions, and a comparatively amount of the fluid should be supplied to the first hydraulic cylinder, whereby the operating response of the transmission is not satisfactorily high. Further, the relatively large parts of the first hydraulic cylinder and the relatively large volume of this cylinder means an accordingly large moment of inertia of the first rotating shaft, which makes it difficult to rapidly increase the speed of the first shaft and the speed of the engine directly coupled thereto, particularly when the transmission is shifted down (to decrease the speed ratio to lower the speed of the second shaft). Further, the first shaft may be temporarily driven by the inertia of the vehicle, which deteriorates the drivability of the vehicle.

There is also known another belt-and-pulley type continuously variable transmission as disclosed in laid-open Publication No. 58-29424 (published in 1983) of examined Japanese Utility Model Application. This transmission includes a shift control valve (four way valve) for controlling the speed ratio of the transmission by feeding a working fluid from a pressure source into one of the two hydraulic cylinders while permitting the fluid to be discharged from the other hydraulic cylinder. The transmission further includes an electromagnetic pressure relief valve for adjusting the pressure of the fluid which is released from the shift control valve. In this type of belt-and-pulley type continuously variable transmission, a relatively high line pressure produced by a hydraulic pump is applied to one of the two hydraulic cylinders whose pressure becomes higher than that of the other cylinder while power is transmitted between the first and second shafts, i.e., to the hydraulic cylinder provided on the drive shaft. In the meantime, a relatively low line pressure prepared by the electromagetic pressure relief valve is applied to the other hydraulic cylinder (provided on the driven shaft). This arrangement eliminates the need of increasing the pressure receiving area of the first hydraulic cylinder as compared with that of the second hydraulic cylinder, and is therefore free of the drawback which arises from the comparatively large pressure receiving area of the first cylinder. In addition, the instant arrangement is advantageous in that the tension of the transmission belt can be suitably controlled by the relatively low line pressure produced by the electromagnetic pressure relief valve.

In the hydraulic control arrangement described just above, the relatively high line pressure produced by the hydraulic pump and supplied to the shift control valve is not regulated at all. Therefore, this line pressure must be set to a sufficiently high level, in order to adequately control the speed ratio of the continuously variable transmission under varying operating conditions. In other words, an extra load is exerted to the hydraulic pump under the normal operating condition, resulting in a corresponding amount of power loss of the pump, which leads to undesirable reduction in the fuel economy of the vehicle.

SUMMARY OF THE INVENTION

It is accordingly an object of the present invention to provide a hydraulic control device for controlling a belt-and-pulley type continuously variable transmission for an automotive vehicle, which permits the speed ratio of the transmission to be changed over a sufficiently wide range, without the first hydraulic cylinder having a larger pressure receiving area than that of the second hydraulic cylinder, and which assures a minimum amount of a hydraulic power loss.

The above object may be achieved according to the principle of the present invention, which provides a hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, the hydraulic control device comprising: (a) a first and a second pressure regulating valve for adjusting a pressure of a working fluid supplied from a hydraulic power source, respectively to a first line pressure and a second line pressure which is lower than the first line pressure; (b) a first pressure line having the first line pressure; (c) a second pressure line having the second line pressure; and (d) a CVT shift control valve device for controlling a speed ratio of the continuously variable transmission, the CVT shift control valve device including a shift-direction switching directional control valve and a shift-speed control flow control valve. The directional control valve is operable between a first position in which one of the pair of hydraulic actuators communicates with the first pressure line, while the other of the pair of hydraulic actuators communicates with the second pressure line or an atmosphere, and a second position in which the above-indicated one hydraulic actuator communicates with the second pressure line or the atmosphere while the other hydraulic actuator communicates with the first pressure line. The flow control valve is adapted to control a rate of supply flow of the fluid into the above-indicated one or other hydraulic actuator and a rate of discharge flow of the fluid from the other or one hydraulic actuator, in response to an operation of the directional control valve.

In the hydraulic control device of the present invention constructed as described above, the fluid is supplied to one of the first and second hydraulic actuators while the fluid is discharged from the other hydraulic actuator, due to a difference between the first and second line pressures prepared by the first and second pressure regulating valves. Therefore, the ratio of the thrusts of the two hydraulic actuators can be varied over a sufficiently wide range, without having to provide the first hydraulic actuator with a comparatively large pressure receiving area. Consequently, the instant hydraulic control device does not cause undesirable reduction in the shifting response of the continuously variable transmission and deterioration of the drivability of the vehicle, which would arise if the pressure receiving area of the first hydraulic actuator is made larger than that of the second hydraulic actuator.

Further, the first line pressure may be adjusted to a required minimum level by the first pressure regulating valve controlled in relation to the output condition of an engine of the vehicle, so that the speed ratio of the continuously variable transmission is changed at a sufficiently high rate and such that the hydraulic power loss is kept to a minimum. Similarly, the second line pressure may be adjusted to a required minimum level by the second pressure regulating valve controlled in relation to the speed ratio and the transmission torque of the continuously variable transmission, so that the transmission belt does not slip on the variable-diameter pulleys. Thus, the power loss of the vehicle associated with an operation of a hydraulic pump as the hydraulic power source can be significantly reduced.

The first line pressure is determined so that a desired or target speed ratio of the transmission can be obtained, while the second line pressure is determined so that a desired tension of the transmission belt can be obtained. Preferably, the second line pressure is adjusted based on an actual speed ratio of the transmission and a current opening angle of the throttle valve of an engine of the vehicle. On the other hand, the first line pressure is preferably adjusted based on the throttle opening angle of the engine and a highest one of the pressures in the first and second hydraulic actuators and the second line pressure.

The directional control valve may preferably include a spool valve having a valve spool axially movable between opposite stroke ends thereof which correspond to the first and second positions indicated above. In this case, the directional control valve further includes a solenoid valve for controlling a pilot pressure applied to one of opposite axial ends of the valve spool of the spool valve to thereby move the valve spool. On the other hand, the flow control valve may include a spool valve having a valve spool axially movable between its opposite stroke ends, to control the rate of supply flow of the fluid into the one or the other hydraulic actuator or the rate of discharge flow of the fluid from the other or the one hydraulic actuator. In this case, too, the flow control valve further includes a solenoid valve for controlling a pilot pressure applied to one of opposite axial ends of the valve spool of the spool valve to thereby move the valve spool.

According to another preferred feature of the invention, the directional control valve comprises a first spool valve which is operable between a first position in which the fluid in the first pressure line is fed into the first hydraulic actuator on the first rotating shaft while the fluid in the second hydraulic actuator on the second rotating shaft is discharged into the second pressure line, and a second position in which the fluid in the first pressure line is fed into the second hydraulic actuator while the fluid in the first hydraulic actuator is discharged into the second pressure line or atmosphere. Further, the flow control valve comprises a second spool valve which has a first operating position in which the supply and discharge flows of the fluid into and from the first and second hydraulic actuators which are selected by the first spool valve are not restricted, a second operating position in which the supply and discharge flows are restricted, and a third position intermediate between the first and second positions. In this case, the hydraulic control device further comprises a first solenoid and a second solenoid. The first solenoid is turned on or energized to place the first spool valve in the first position for increasing the speed ratio of the continuously variable transmission, and turned off or deenergized to place the first spool valve in the second position for decreasing the speed ratio. The second solenoid is turned on to place the second spool valve in the first position for increasing a rate of change of the speed ratio, and turned off to place the second spool valve in the second position for decreasing the rate of change of the speed ratio.

In the preferred arrangement indicated above, the first and second solenoids are both turned off or deenergized by a control unit adapted to control the speed ratio of the transmission, if a fail-safe system of the control unit is activated due to any abnormality associated with the first and second solenoids. In this case, therefore, the first spool valve is placed in the second position in which the speed ratio of the transmission is decreased. On the other hand, the second spool valve is placed in the second position in which the rate of decrease in the speed ratio is set relatively low. Thus, the instant arrangement prevents a rapid change in the speed ratio of the transmission, and assures a safe running of the vehicle, even in the event of a trouble with the first or second solenoid. Furthermore, the vehicle can be re-started, since the CVT shift control valve is set in a state in which the speed ratio of the transmission is reduced to a lowest value (i.e., the CVT is shifted down to its lowest speed ratio).

In one advantageous form of the above feature or arrangement, the CVT shift control valve device further comprises a first solenoid valve and a second solenoid valve. The first solenoid valve includes the first solenoid, and is adapted to produce a pilot pressure which is applied to a valve spool of the first spool valve to place the first spool valve in the second position when the first soleneoid is off. The second solenoid valve includes the second solenoid, and is adapted to produce a pilot pressure which is applied to a valve spool of the second spool valve to place the second spool valve in the second position when the second solenoid is off.

According to a further preferred feature of the present invention, the hydraulic control device further comprises a by-pass passage and a check valve. The by-pass passage connects one of the hydraulic actuators and the second pressure line, and includes a restrictor. The check valve is provided in the by-pass passage, and permits a flow of the fluid through the by-pass passage in a direction toward the above-indicated one hydraulic actuator, while inhibits a flow of the fluid through the by-pass passage in a direction toward the second pressure line.

In the above arrangement wherein the above-indicated one hydraulic actuator is connected to the second pressure line, the pressure in that one hydraulic actuator may be made substantially equal to the second line pressure, without fail, when the pressure in that one hydraulic actuator becomes lower than that in the other hydraulic actuator. This makes it possible to adequately control the tension of the transmission belt. Further, the by-pass passage is closed by the check valve when the pressure in the above hydraulic actuator becomes higher than that in the other hydraulic actuator. This prevents a hydraulic power loss or increased amount of consumption of the pressurized fluid due to leakage of the fluid from the above one hydraulic actuator into the second pressure line, if the by-pass passage would not have a check valve and if the diameter of the restrictor is not sufficiently small. Further, even if the diameter of the restrictor of the by-pass passage is made relatively small, the pressure in the above-indicated one hydraulic actuator may be made substantially equal to that of the second line pressure when the pressure in the above one hydraulic cylinder becomes lower than that in the other hydraulic actuator. If a check valve as described above would not be provided in the by-pass passage, the restrictor provided in the by-pass passage is required to perform two incompatible functions in two different situations, i.e., when the pressure in the above one hydraulic actuator becomes lower or higher than that in the other hydraulic actuator. Namely, when the pressure in the one hydraulic actuator is lower than that in the other hydraulic cylinder, the restrictor is required to permit the fluid to flow through the by-pass passage in order that the pressure in the above one hydraulic actuator is maintained at the level of the pressure in the other hydraulic actuator. Conversely, when the pressure in the above one hydraulic cylinder becomes higher than that in the other hydraulic actuator, the restrictor is required to restrict the fluid flow from the above one hydraulic actuator into the second pressure line, in order to avoid the hydraulic power loss while assuring sufficiently high shifting response of the transmission. The restrictor provided in a conventional hydraulic control device cannot sufficiently serve these two incompatible functions.

According to a still further preferred feature of the present invention, the flow control valve includes a valve housing having a cylindrical bore and a plurality of ports formed therein, and a valve spool slidably received in the cylindrical bore for controlling the rates of supply and discharge flows of the fluid. The valve spool includes a plurality of lands for opening and closing the ports. Either the valve housing or each of the lands has at least one cutout for permitting a gradual change in the rates of supply and discharge flows of the fluid through the ports as the valve spool is axially moved. In the instant arrangement, the rates at which the fluid is supplied and discharged through the ports can be accurately and stably changed with a distance of movement of the spool, even while the amount of opening of the ports is relatively small.

The above-indicated at least one cutout may consist of a tapered end portion of each land, at least one V-shaped notch formed in each land, or a stepped cutout formed in each land. Alternatively, the at least one cutout may consist of at least one tapered notch, at least one V-shaped notch or a stepped cutout, which is formed in a portion of an inner circumferential surface of the cylinderical bore which slidably engages the land.

According to another aspect of the present invention, there is also provided a hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, a first line pressure and a second line pressure being applied to one and the other of the pair of hydraulic actuators, respectively, so as to control a speed ratio of the continuously variable transmission, the hydraulic control device comprising: (a) a first pressure line having the first line pressure; (b) a second pressure line having the second line pressure; (c) a switch valve connected to a first hydraulic actuator of the pair of hydraulic actuators which is provided on the first rotating shafts, and to the second pressure line, the switch valve generating as an output pressure thereof a higher one of a pressure in the first hydraulic actuator and the second line pressure; and (d) a first pressure regulating valve for adjusting the first line pressure such that the first line pressure is higher than the output pressure by a predetermined amount.

In the hydraulic control device constructed as described above wherein the switch valve applies to the first pressure regulating valve the higher one of the pressure in the first hydraulic actuator and the second line pressure, the second line pressure is applied to the first pressure regulating valve if the first and second hydraulic actuators are drained at the time of re-start of the vehicle engine. That is, the speed ratio of the transmission can be adequately controlled with the first line pressure normally controlled by the first pressure regulating valve based on the second line pressure, when the vehicle is started following the re-starting of the engine.

In the hydraulic control device according to the above aspect of the invention, the first pressure regulating valve preferably includes a valve spool for connecting the first pressure line selectively to a third pressure line or a suction line, to thereby release the fluid from the first pressure line, and a spring for biasing the valve spool toward its closed position. The valve spool has a first pressure receiving surface which receives the first line pressure to bias the valve spool toward its open position, a second pressure receiving surface which receives the pressure supplied from the switch valve to bias the valve spool toward the closed position, and a third pressure receiving surface which receives a throttle pressure representative of an opening angle of a throttle valve of the vehicle, to bias the valve spool toward the closed position.

The switch valve may include a valve spool which is axially movable between its first position for applying the pressure in the first hydraulic actuator to the first pressure regulating valve, and its second position for applying the second line pressure to the first pressure regulating valve. The valve spool has a first pressure receiving surface which receives the pressure in the first hydraulic actuator to bias the valve spool toward the first position, and a second pressure receiving surface which receives the second line pressure to bias the valve spool toward the second position. The switch valve may further include a spring for biasing the valve spool toward the second position. In this instance, the second line pressure can be more rapidly applied to the first pressure regulating valve, when the first hydraulic actuator is drained.

According to a further aspect of the present invention, there is provided a hydraulic control device for controlling a belt-and pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, a first line pressure and a second line pressure being applied to one and the other of the pair of hydraulic actuators, respectively, so as to control a speed ratio of the continuously variable transmission, the hydraulic control device comprising: (a) a first pressure line having the first line pressure; (b) a second pressure line having the second line pressure; (c) a speed-ratio sensing valve for sensing an actual speed ratio of the continuously variable transmission and generating a speed-ratio pressure representative of the actual speed ratio; (d) a hydraulically operated pressure regulating valve for regulating the second line pressure, based on the speed-ratio pressure; and (e) a limit valve for limiting an increase in the speed-ratio pressure.

In the instant hydraulic control valve wherein the an amount of increase in the speed-ratio pressure applied from the speed-ratio sensing valve to the second pressure regulating valve is limited, the second line pressure generated by the second pressure regulating valve based on the speed-ratio pressure can be controlled substantially following an ideal curve for maintaining the tension of the transmission belt at an optimum value. Accordingly, the instant arrangement is effective to avoid an increase of the second line pressure to an unnecessary high level while the speed ratio of the transmission is relatively low, and is also effective to avoid a shortage of the second line pressure which may cause the transmission belt to slip on the pulleys while the speed ratio of the transmission is relatively high.

The limit valve may be adapted to limit the increase in the speed-ratio pressure, in relation to a currently required output of an engine of the vehicle. Preferably, the limit valve is adapted to change an upper limit fo the speed-ratio pressure, based on a throttle pressure representative of an opening angle of a throttle valve of the engine. In this case, the limit valve may include a valve spool for selective connection and disconnection of a fluid passage communicating with the speed-ratio sensing valve, to and from a drain line, and further include a spring for biasing the valve spool toward its closed position. A thrust produced based on the speed-ratio pressure acts on the valve spool in a direction toward its open position while a thrust produced based on the throttle pressure acts on the valve spool in a direction toward its closed position. The valve spool is moved toward the open position to thereby limit the increase in the speed-ratio pressure, when the thrust based on the speed-ratio pressure exceeds a sum of the thrust based on the throttle pressure and a thrust of the spring.

According to a still further aspect of the present invention, there is provided a hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, a working fluid in a first pressure line being fed into one of the pair of actuators and the fluid in the other hydraulic actuator being discharged into a second pressure line or an atmosphere, while a third pressure line is provided for lubrication of a power transmitting system which includes the continuously variable transmission, or for other purposes, the hydraulic control device comprising: (a) a first pressure regulating valve for regulating a first line pressure which is applied to the one hydraulic actuator through the first pressure line; (b) a second pressure regulating valve provided downstream of the first pressure regulating valve, the second pressure regulating valve regulating a second line pressure in the second pressure line such that the second line pressure is lower than the first line pressure; and (c) a third pressure regulating valve provided downstream of the first pressure regulating valve and in parallel with the second pressure regulating valve. The third pressure regulating valve is adapted to regulate a third line pressure in the third pressure line such that the third line pressure is lower than the first line pressure.

In the instant hydraulic control device constructed as described above wherein the second and third pressure lines are provided in parallel downstream of the first pressure line, the second line pressure can be adjusted by the second pressure regulating valve, to be lower than the third line pressure, if the required second line pressure for establishing the optimum tension of the transmission belt is lower than the third line pressure. Namely, it is not necessary to maintain the second line pressure at an unnecessarily high level to assure the required third line pressure as in the conventional arrangement. Consequently, the instant hydraulic control device suffers from a minimum hydraulic power loss due to the unnecessarily high second line pressure, which requires the first line pressure to be accordingly high.

According to one preferred feature of the hydraulic control device described just above, the first pressure regulating valve consists of a pressure relief type pressure regulating valve which releases the fluid from the first pressure line into the third pressure line, and the second pressure regulating valve consists of a pressure reducing type pressure regulating valve which reduces the first line pressure to the second line pressure. Further, the third pressure regulating valve consists of a pressure relief type pressure regulating valve which releases the fluid from the third pressure line into a drain. In this case, the hydraulic circuit can be comparatively simplified.

According another preferred feature of the same hydraulic control device, the first pressure adjusting valve adjusts the first line pressure, based on a pressure which represents a currently required output of the vehicle, and a higher one of the second line pressure and a pressure in a first hydraulic actuator of the pair of hydraulic actuators which is provided on the first rotating shaft, such that the pair of hydraulic actuators have a thrust ratio that permits an actual speed ratio of the continuously variable transmission to coincide with a determined target speed ratio.

According to a further preferred feature of the same hydraulic control device, the second pressure regulating valve adjusts the second line pressure, based on a currently required output of the vehicle and a speed ratio of the continuously variable transmission, such that the transmission belt has a minimum tension required to transmit a torque that is required to provide the currently required output.

The second pressure regulating valve may consist of a hydraulically operated pressure regulating valve which adjusts the second line pressure, based on a pressure representative of the currently required output of the vehicle and a pressure representative of the speed ratio of the continuously variable transmission. Alternatively, the second pressure regulating valve may consist of a pressure regulating servo valve which is electrically controlled based on a signal representative of the currently required output of the vehicle and a signal representataive of the speed ratio of the continuously vaiable transmission.

According to a still further preferred feature of the same hydraulic control device, the third pressure regulating valve operates to maintain the third line pressure at a predetermined constant level suitable for the fluid to be used as a lubricating oil for a power transmitting system including the continuously variable transmission, or suitable for the fluid to be supplied to a lock-up clutch or a fluid coupling incorporated in the power transmitting system.

The pressure reducing type pressure regulating valve means a pressure regulating valve which reduces a received input pressure to an output pressure lower than the input pressure, independently of the received input pressure or a rate of flow of the input fluid. On the other hand, the pressure relief type pressure regulating valve means a pressure regulating valve which releases a part of the fluid from a relevant pressure line into a downstream line, to thereby adjust the pressure in the relevant pressure line.

In accordance with a yet further aspect of the invention, there is provided a hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, the hydraulic control device comprising: (a) a first pressure line having a first line pressure; (b) a second pressure line having a second line pressure; (c) a CVT shift control valve device for controlling a speed ratio of the continuously variable transmission, such that a working fluid in the first pressure line is fed into one of the pair of hydraulic cylinders while the fluid in the other hydraulic cylinder is discharged into the second pressure line or an atmosphere, and (d) a pressure regulating valve including a valve spool which is movable in a pressure-increasing direction to increase the first line pressure, and in a pressure-decreasing direction to decrease the first line pressure. The valve spool has a first pressure receiving surface which receives the first line pressure to produce a first thrust for biasing the valve spool in the pressure-decreasing direction, and a second pressure receiving surface which receives a highest one of pressures in the pair of hydraulic cylinders and the second line pressure, to produce a second thrust for biasing the valve spool in the pressure-increasing direction.

In the pressure regulating valve of the instant hydraulic control device, the area of the second pressure receiving surface which receives the higher one of the pressures of the two hydraulic cylinders to move the valve spool in the pressure-increasing direction is smaller than that of the first pressure receiving surface which receives the first line pressure to move the spool in the pressure-decreasing direction. Therefore, the first line pressure (feedback pressure) received by the first pressure receiving surface has a greater influence upon the pressure level adjusted by the pressure regulating valve, than the pressure received by the second pressure receiving surface. In this arrangement, the maximum level of the first line pressure established by the pressure regulating valve can be limited to a suitable value, even if the pressure received by the second pressure receiving surface becomes equal to the first line pressure due to mechanical blocking of a movable rotor of the variable-diameter pulley which corresponds to the hydraulic actuator having the higher pressure. Consequently, the first line pressure will not rise to an unnecessarily high level even when the speed ratio of the transmission is fixed at its highest value at which the movable rotors of the variable diameter pulleys can no longer be moved. Since this arrangement is available without using a valve to prevent such an excessive rise of the first line pressure, the hydraulic circuit can be made relatively simple.

In one preferred arrangement of the instant hydraulic control device has a third pressure receiving surface which receives a pressure representative of a currently required output of an engine of the vehicle, to produce a third thrust for biasing the valve spool in the pressure-increasing direction, and the first pressure regulating valve further includes a return spring for producing a fourth thrust for biasing the valve spool in the pressure-increasing direction. The first line pressure is determined by an equilibrium position of the valve spool in which the first thrust is balanced with a sum of the second, third and fourth thrusts.

DESCRIPTION OF THE DRAWINGS

The above and optional objects, features and advantages of the present invention will be better understood by reading the following detailed description of presently preferred embodiments of the present invention, when considered in connection with the accompanying drawings, in which:

FIG. 8 is a graph indicating an ideal relationship between a second line pressure and a speed ratio of a continuously variable transmission shown in FIG. 1;

FIG. 10 is a view explaining a relationship between operating conditions of first and second solenoid valves of the shift control valve device of FIG. 9, and a shift motion of the continuously variable transmission;

FIGS. 11, 12 and 13 are graphs showing relationships between the speed ratio of the continuously variable transmission, and some specific hydraulic pressures in the hydraulic system, the graph of FIG. 11 relating to a positive-torque condition of the continuously variable transmission, the graph of FIG. 12 relating to a negative-torque (engine-brake) condition of the transmission, and the graph of FIG. 13 relating to a non-load condition of the transmission;

DETAILED DESCRIPTION OF THE PREFERRED EMBODIMENTS

Figure 1:
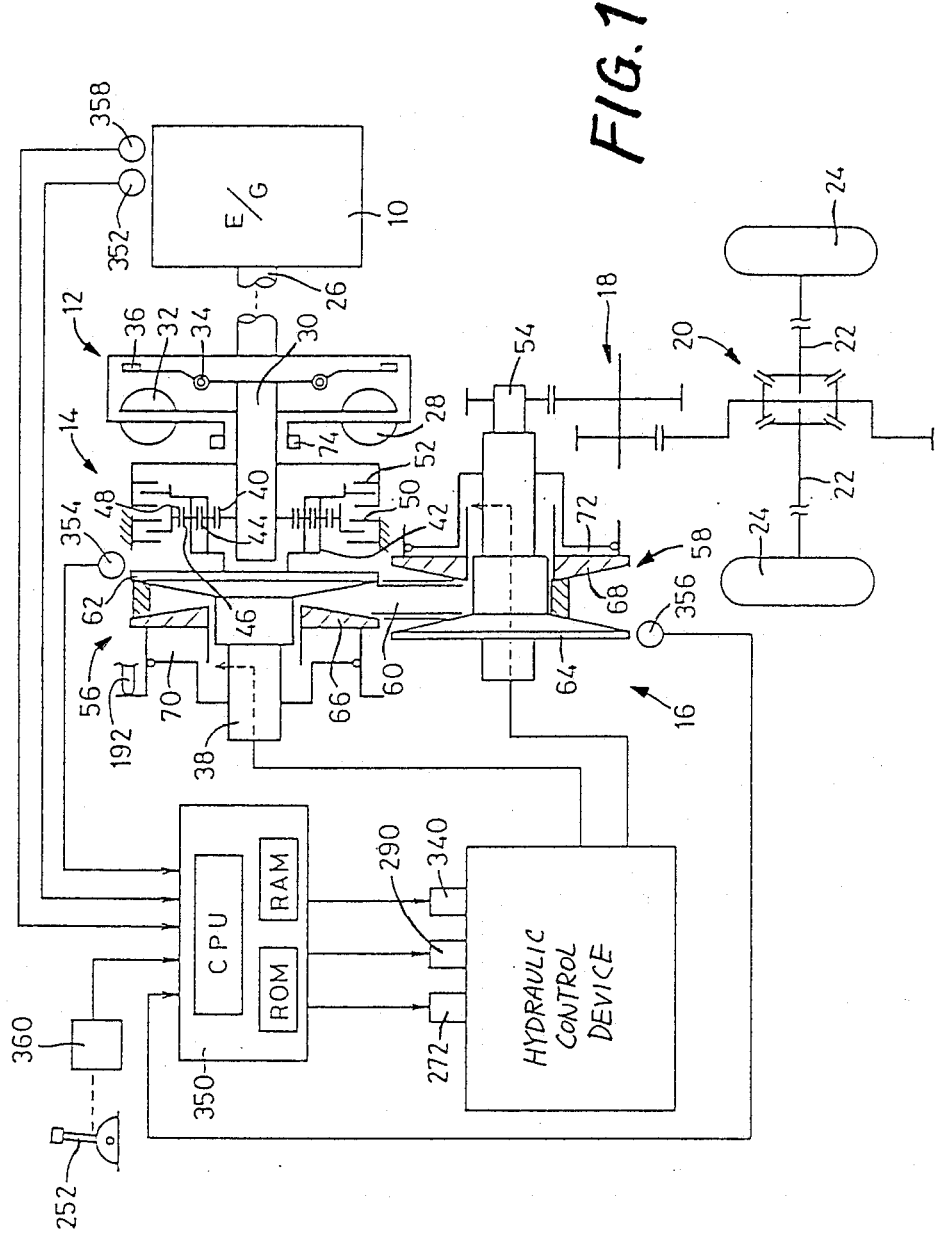
FIG. 1 is a schematic view of a power transmitting system for a motor vehicle, which is controlled by one embodiment of a hydraulic control device of the present invention.

Referring first to FIG. 1, there is shown a power transmitting system wherein power of an engine 10 of a motor vehicle is transmitted to drive wheels 24, via a fluid coupling 12 with a lock up clutch 36, an auxiliary transmission 14, a belt-and-pulley continuously variable transmission (hereinafter abbreviated as "CVT") 16, an intermediate gear device 18, a differential gear device 20, and drive shafts 22 connected to the drive wheels 24.

The fluid coupling 12 has a pump impeller 28 connected to a crankshaft 26 of the engine 10, a turbine 32 fixed to an input shaft 30 of the auxiliary transmission 14 and rotated by rotation of the pump impeller 28 via a fluid in the coupling 12, and the above-indicated lock- up clutch 36 fixed to the input shaft 30 via a damper 34. The lock-up clutch 36 is engaged to directly couple the crankshaft 26 to the input shaft 30 when the running speed of the vehicle or the rotating speed of the engine 10 or turbine 32 exceeds a predetermined limit.

The auxiliary transmission 14 consists of a well known, double-pinion type planetary gear mechanism, which includes: a pair of mutually meshing planetary gears 44, 46 which are rotatably supported by a carrier 42 fixed to an input shaft 38 of the CVT 16 (output shaft of the auxiliary transmission 14); a sun gear 40 which is fixed to the input shaft 30 of the auxiliary transmission 14 (output shaft of the fluid coupling 12) and which meshes with the internal planetary gear 44; a ring gear 48 which meshes with the external planetary gear 46; a REVERSE brake 50 for stopping rotation of the ring gear 48; and a FORWARD clutch 52 for connecting the carrier 42 to the input shaft 30 of the auxiliary transmission 14. The REVERSE brake 50 and the FORWARD clutch 52 are hydraulically operated frictional coupling devices. When both of these two devices 50, 52 are placed in their disengaged position, the auxiliary transmission 14 is placed in its neutral position wherein power is not transmitted through the transmission 14. When the FORWARD clutch 52 is engaged, the output shaft 30 of the fluid coupling 12 is connected to the input shaft 38 of the CVT 16, whereby power from the engine 10 is transmitted in a forward direction to drive the vehicle frontwards. When the REVERSE brake 50 is engaged, on the other hand, the direction of rotation of the input shaft 38 of the CVT 16 is reversed with respect to that of the output shaft 30 of the fluid coupling 12, whereby the power from the engine 10 is transmitted in a reverse direction to drive the vehicle rearwards.

The CVT 16 has a pair of variable-diameter pulleys 56, 58 provided on its input and output shafts 38, 54, respectively, and a transmission belt 60 which connects the input and output pulleys 56, 58. The two pulleys 56, 58 have substantially the same nominal diameters. Each of the pulleys 56, 58 consists of a fixed rotor 62, 64 fixed to the input or output shaft 38, 54, and a movable rotor 66, 68 which is axially slidable on the shaft 38, 54 and which is rotated with the shaft 38, 54. The movable rotors 66 and 68 are moved by respective hydraulic actuators in the form of hydraulic cylinders 70, 72, so as to change a width of a V groove defined by the fixed and movable rotors 62–66 or 64–68, whereby effective diameters of the pulleys 56, 58 (diameters at which the belt 60 engages the pulleys) are changed, so as to vary a speed ratio "e" (Nout/Nin, where Nout=rotating speed of the output shaft 54, and Nin=rotating speed of the input shaft 38) of the CVT 16. Since the input and output pulleys 56, 58 have substantially the same nominal diameters, the corresponding input and output hydraulic cylinders 70, 72 have substantially the same pressure-receiving areas. Usually, a tension of the transmission belt 60 is associated with a force acting thereon, which is produced by the pressure in one of the two cylinders 70, 72 which is provided on the driven pulley 56, 58.

An oil pump 74 is connected integrally with the pump impeller 28 of the fluid coupling 12 and is consequently driven by the crankshaft 26. This pressure source is used as a hydraulic pressure source of a hydraulic control device for controlling the instant power transmitting system.

Figure 2:
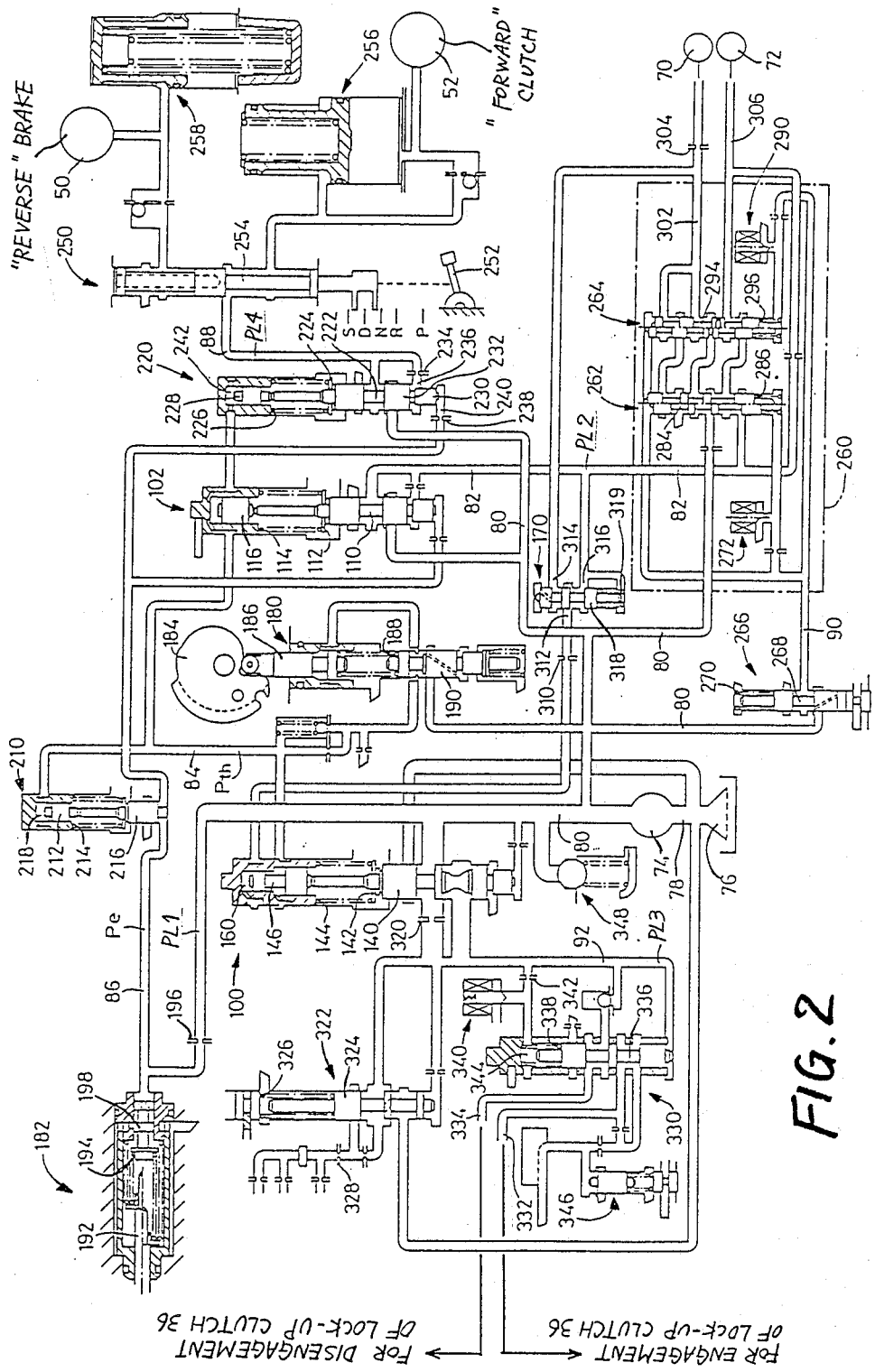
FIG. 2 is a circuit diagram showing the hydraulic control device for controlling the power transmitting system of FIG. 1.

The hydraulic control device for controlling the power transmitting system generally shown in FIG. 1 is illustrated in FIG. 2. The oil pump 74 sucks up a working fluid from a reservoir (not shown) through a strainer 76 and a suction line 78, and delivers the thus pressurized fluid to a first pressure line 80 which has a first line pressure PL1. The first line pressure PL1 in the first pressure line 80 is adjusted by a first pressure regulating valve 100 of an overflow or relief type, which is operated to return a portion of the fluid from the pump 74 to the suction line 78 and deliver a portion of the fluid to a LOCK-UP CLUTCH line 92. The first line pressure PL1 is reduced into a second line pressure PL2 by a second pressure regulating valve 102 of a pressure reducing type.

Figure 3:
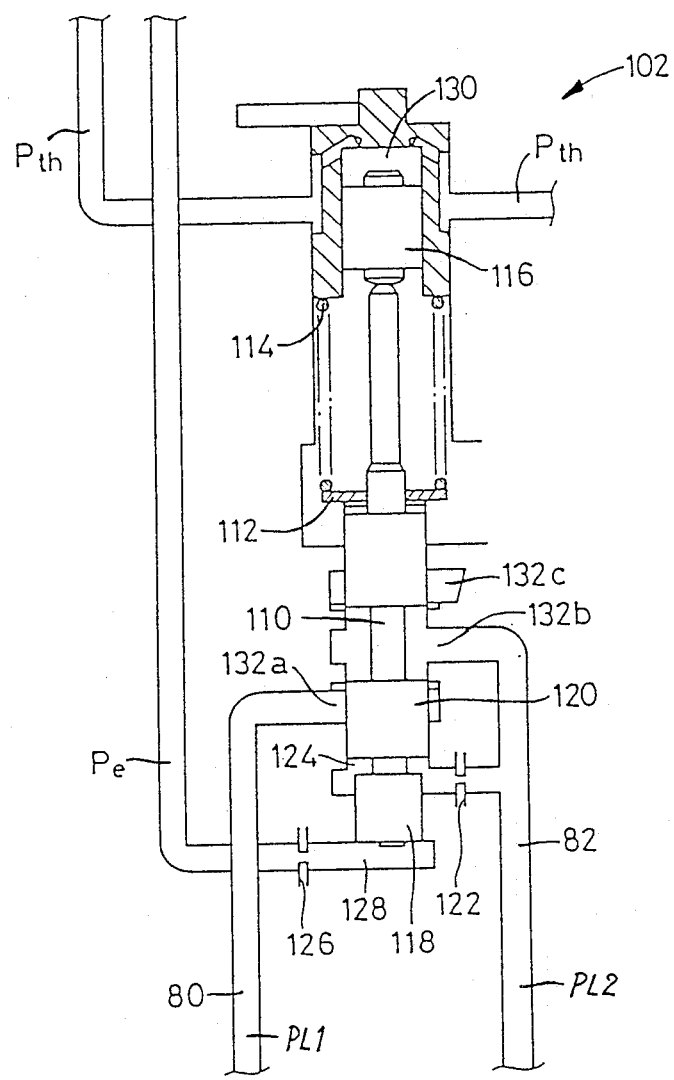
FIG. 3 is a view illustrating details of a second pressure regulating valve shown in FIG. 2.

The construction of the second pressure regulating valve 102 will be first described, by reference to FIG. 3. This second pressure regulating valve 102 is provided downstream of the first pressure regulating valve 100, and has a valve spool 110 for selective connection and disconnection of the first and second pressure lines 80 and 82. The second pressure regulating valve 102 further has a spring seat 112, a return spring 114 and a plunger 116. Between a first land 118 and a second land 120 of the spool 110, there is formed a chamber 124 to which the second line pressure PL2 is applied as a feedback pressure through a restrictor 122, whereby the spool 110 is biased toward its closed position by the second line pressure PL2. The first land 118 is also exposed to a chamber 128 to which a SPEED RATIO pressure Pe (which will be described) is applied through a restrictor 126, whereby the spool 110 is biased toward its closed position by the pressure Pe. At the same time, the spool 110 of the second pressure regulating valve 102 is baised toward its open position, by the return spring 114 via the spring seat 112. An outer end face of the plunger 116 is exposed to a chamber 130 to which a THROTTLE pressure Pth (which will be described) is applied, whereby the spool 110 is biased toward its open position by this THROTTLE pressure Pth. The spool 110 is located at an equilibrium position determined by the following equation (1):

$$PL2 = (A3 \cdot Pth + W - A1 \cdot Pe)/(A2 - A1) \ldots \quad (1)$$

where,
A1: Pressure receiving area of the first land 118
A2: Pressure receiving area of the second land 120
A3: Pressure receiving area of the plunger 116
W: Biasing force of the return spring 114

Described more specifically, the valve spool 110 is moved so as to satisfy the equation (1), alternately between a first position in which the fluid in the first pressure line 80 communicating with a port 132a is fed into the second pressure line 82 through a port 132b, and a second position in which the fluid in the second pressure line 82 communicating with the port 132b is returned to a drain through a drain port 132c. In this way, the second line pressure PL2 is established. Since the second pressure line 82 is a closed hydraulic circuit, the second pressure regulating valve 102 is adapted to reduce the relatively high first line pressure PL1 to the second line pressure PL2.

Figure 4:
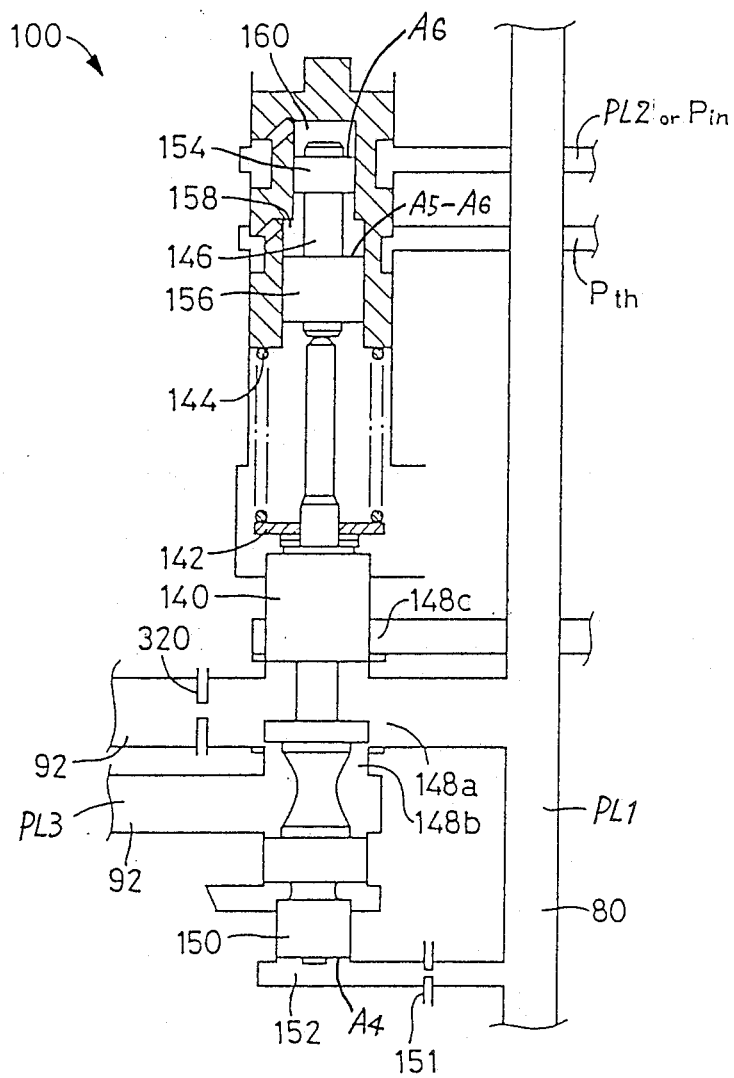
FIG. 4 is a view illustrating details of a first pressure regulating valve shown in FIG. 2.

As shown in FIG. 4, the first pressure regulating valve 100 includes a valve spool 140, a spring seat 142, a return spring 144 and a plunger 146. The spool 140 operates to effect selective connection and disconnection of a port 148a communicating with the first pressure line 80, to and from a drain port 148b or a port 148c.

An outer end face of a first land 150 of the spool 140 is exposed to a chamber 152 to which the first line pressure PL1 is applied through a restrictor 151, whereby the spool 140 is biased toward its open position by the first line pressure PL1. The plunger 146, which is coaxial with the spool 140, is formed with a first land 154 and a second land 156. Between these two lands 154, 156, there is formed a chamber 158 to which the THROTTLE pressure Pth is applied. An outer end face of the first land 154 is exposed to a chamber 160 to which higher one of the second line pressure PL2 and an input cylinder pressure Pin in the input side cylinder 70 is selectively applied, according to an operation of a switch valve 170 which will be described. The spool 140 is biased toward its closed position, by a biasing force of the return spring 144 via the spring seat 142. The spool 140 is located at an equilibrium position determined by the following equation (2):

$$PL1 = [(Pin \text{ or } PL2) \cdot A6 + Pth(A5 - A6) + W]/A4 \ldots \quad (2)$$

where,
A4: Pressure receiving area of the first land 150
A5: Cross sectional area of the second land 156 of the plunger 146
A6: Pressure receiving area of the first land 154 of the plunger 146
W: Biasing force of the return spring 144

Described more specifically, the valve spool 140 is moved to a position at which there exists an equilibrium of the following thrust forces: a thrust based on a feedback pressure (first line pressure PL1) which acts on the first pressure receiving surface having the area A4, in a direction to reduce the first line pressure PL1; a thrust based on the higher one of the second line pressure PL2 and the input side pressure Pin in the hydraulic cylinder 70, which acts on the second pressure receiving surface having the area A6, in a direction to increase the first line pressure PL1; a thrust based on the THROTTLE pressure Pth which acts on the third pressure receiving surface having the area (A5-A6), in the direction to increase the first line pressure PL1; and the thrust W of the return spring 144 in the direction to increase the first line pressure PL1. As a result, a portion of the fluid in the first pressure line 80 communicating with the port 148a is fed simultaneously through both of the drain port 148b and the port 148c, whereby the first line pressure PL1 is established. In the present embodiment, the pressure receiving area A4 is larger than the pressure receiving area A6. Accordingly, the adjusting value (first line pressure PL1) of the first pressure regulating valve 100 is influenced to a greater extent by the feedback pressure (first line pressure PL1) acting on the pressure receiving area A4, than by the higher one of the input side pressure Pin in the cylinder 70 and the second line pressure PL2 which acts on the pressure receiving area A6.

Figure 5:
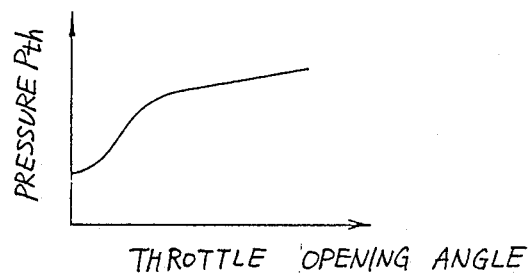
FIG. 5 is a graph indicating an output characteristic of a throttle-opening sensing valve shown in FIG. 2.

Referring back to FIG. 2, the THROTTLE pressure Pth indicated above represents an actual opening angle θth of a throttle valve of the engine 10, and is produced by a throttle-opening sensing valve 180. The SPEED-RATIO pressure Pe represents an actual speed ratio of the CVT 16, and is produced by a speed-ratio sensing valve 182. Described in detail, the throttle-opening sensing valve 180 includes: a cam 184 rotated in response to an operation of the throttle valve; a plunger 186 which engages a cam surface of the cam 184 and which is axially moved in relation to an angle of rotation of the cam 184; and a valve spool 190 which is moved to an equilibrium position in which a thrust of the plunger 186 acting on the spool 190 via a spring 188 is balanced with the first line pressure PL1, whereby the first line pressure PL1 is reduced into the THROTTLE pressure Pth which corresponds to the actual opening angle θth of the throttle valve. FIG. 5 shows a relationship between the THROTTLE pressure Pth and the throttle opening angle θth. The THROTTLE pressure Pth is supplied through a fluid line 84 to the first pressure regulating valve 100, the second pressure regulating valve 102, a limit valve 210 and a fourth pressure regulating valve 220.

Figure 6:
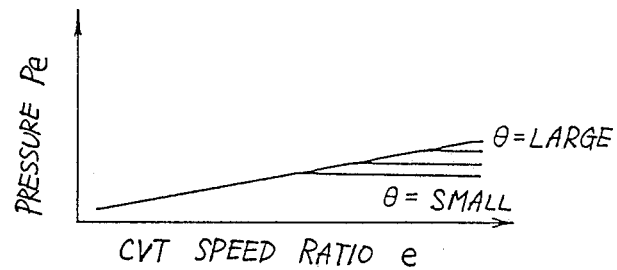
FIG. 6 is a graph indicating an output characteristic of a speed-ratio sensing valve shown in FIG. 2.

The SPEED-RATIO sensing valve 182 includes: a sensing rod 192 which is held in sliding engagement with the movable rotor 66 on the input shaft 38 of the CVT 16, so that the rod 192 is axially moved by an amount equal to an axial displacement of the rotor 66; a spring 194 which produces a biasing force which varies with the position of the sensing rod 192; and a valve spool 198 which receives the biasing force of the spring 194, and which is moved to an equilibrium position in which a thrust based on the biasing force of the spring 194 is balanced with a thrust based on the first line pressure PL1, whereby a rate of flow of the fluid to the drain from the sensing valve 182 is changed. If the speed ratio "e" of the CVT 16 becomes relatively high, i.e., if the fixed rotor 62 on the input shaft 38 is moved toward the movable rotor 66 (with the width of the V groove becoming smaller), the sensing rod 192 is moved into the valve 182. Consequently, the amount of the fluid which is fed into the valve 182 through an orifice 196 and which is discharged to the drain by the spool 198 is reduced, whereby the pressure at a position downstream of the orifice 196 is raised. This raised pressure is the SPEED-RATIO pressure Pe, which is increased as the speed ratio "e" of the CVT 16 is increased, as indicated in FIG. 6. The thus generated SPEED-RATIO pressure Pe is supplied through a fluid line 86 to the second and fourth pressure regulating valves 102 and 220.

Figure 7:
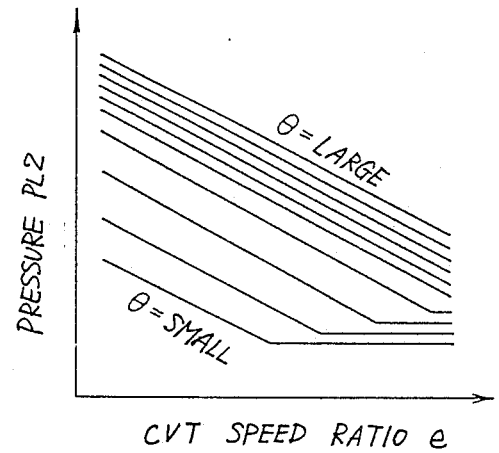
FIG. 7 is a graph indicating an output characteristic of the second pressure regulating valve of FIG. 3.

The limit valve 210 includes a plunger 212, and a valve spool 216 which receives a thrust of a spring 214 and a thrust of the plunger 212, in a direction toward its closed position. An outer end face of the plunger 212 is exposed to a chamber 218 to which the THROTTLE pressure Pth is applied. The spool 216, which is biased toward its closed position by the thrust of the spring 214 and the thrust of the plunger 212 based on the THROTTLE pressure Pth, is biased in the opposite direction toward its open position, by a thrust based on the SPEED-RATIO pressure Pe. When the thrust based on the SPEED-RATIO pressure Pe exceeds a sum of the thrusts of the spring 214 and plunger 212, the spool 216 is placed in the open position in which the fluid line 86 is connected to the drain, to thereby prevent an increase of the SPEED-RATIO pressure Pe beyond an upper limit in relation to the throttle opening angle θth, as indicated in FIG. 6. Since the SPEED-RATIO pressure Pe is saturated at the upper limit predetermined by the throttle opening angle θth, the second line pressure PL2 controlled by the second pressure regulating valve 102 according to the equation (1) is prevented from being lowered with a decrease of the throttle opening angle θth, while the speed ratio "e" of the CVT 16 is relatively high, as indicated in FIG. 7. In other words, the instant hydraulic control circuit provides the relatively low line pressure (second line pressure PL2) which is varied with the speed ratio "e", for controlling the tension of the transmission belt 60, almost according to an ideal curve as indicated in FIG. 8, without using an electromagnetic pressure regulating servo valve controlled by a microcomputer. Therefore, the hydraulic control device is available at a comparatively reduced cost.

The fourth pressure regulating valve 220 is adapted to produce a fourth line pressure PL4 for activating the REVERSE brake 50 and the FORWARD clutch 52 of the auxiliary transmission 14. The fourth pressure regulating valve 220 includes: a valve spool 222 for selective connection and disconnection of the first pressure line 80 and a fourth pressure line 88; a spring seat 224; a return spring 226; and a plunger 228. Between a first land 230 and a second land 232 of the spool 222, there is formed a chamber 236 to which the fourth line pressure PL4 is applied as a feedback pressure through a restrictor 234. Namely, the spool 222 is biased by the fourth line pressure PL4 in a direction toward its closed position. An outer end face of the first land 230 is exposed to a chamber 240 to which the SPEED-RATIO pressure Pe is applied through a restrictor 238, whereby the spool 222 is biased by the SPEED-RATIO pressure Pe toward its closed position. At the same time, the valve spool 222 is biased in a direction toward its open position, by a biasing force of the return spring 226 through a spring seat 224. Further, an outer end face of the plunger 228 is exposed to a chamber 242 to which the THROTTLE pressure Pth is applied, whereby the spool 222 is biased toward the open position by the THROTTLE pressure Pth. In this arrangement, the fourth line pressure PL4 is adjusted to an optimum level, according to an equation similar to the equation (1) given above, based on the SPEED-RATIO pressure Pe and the THROTTLE pressure Pth. This optimum level is a minimum level required to permit the auxiliary transmission 14 to transmit a torque without a slip in the REVERSE brake 50 and the FORWARD clutch 52.

The fourth line pressure PL4 obtained by the fourth pressure regulating valve 220 is supplied to the FORWARD clutch 52 or REVERSE brake 50 through a shift-lever valve 250. That is, the shift-lever valve 250 has a valve spool 254 which is axially moved in relation to an operating position of a shift lever 252 of the vehicle. When the shift lever 252 is placed in its N (NEUTRAL) position, the fourth line pressure PL4 is not supplied to the auxiliary transmission 14. When the shift lever 252 is placed in its L (LOW), S (SECOND) or D (DRIVE) position, the fourth line pressure PL4 is supplied primarily to the FORWARD clutch 52 while the fluid is discharged from the REVERSE brake 50. When the shift lever 252 is placed in its R (REVERSE) position, the fourth line pressure PL4 is supplied primarily to the REVERSE brake 50 while the fluid is discharged from the FORWARD clutch 52. With the shift lever 252 placed in its P (PARKING) position, the fluid is discharged from both of the FORWARD clutch 52 and the REVERSE brake 50. Accumulators 256 and 258 are connected to the FORWARD clutch 52 and REVERSE brake 50, in order to permit smooth frictional engagements of these members 52, 50.

The first and second line pressures PL1, PL2 adjusted by the first and second pressure regulating valves 100, 102 are supplied to one and the other of the two hydraulic cylinders 70, 72, through a CVT shift control valve device 260, so that the speed ratio "e" of the CVT 16 is controlled. The CVT shift control valve device 260 consists of a shift-direction switching directional control valve 262, and a shift-speed control flow control valve 264. To operate these directional control and flow control valves 262, 264, a pilot pressure Pp produced by a pilot pressure control valve 266 is applied to the valves 262, 264 through a pilot line 90. The pilot pressure control valve 266 includes a valve spool 268 for selective connection and disconnection of the first pressure line 80 and the pilot line 90, and a spring 270 for biasing the spool 268 toward its open position. The spool 268 is moved to an equilibrium position in which the pilot pressure Pp acting in the direction toward the closed position is balanced with the biasing force of the spring 270. Thus, the first line pressure PL1 is reduced to the suitable pilot pressure Pp.

Figure 9:
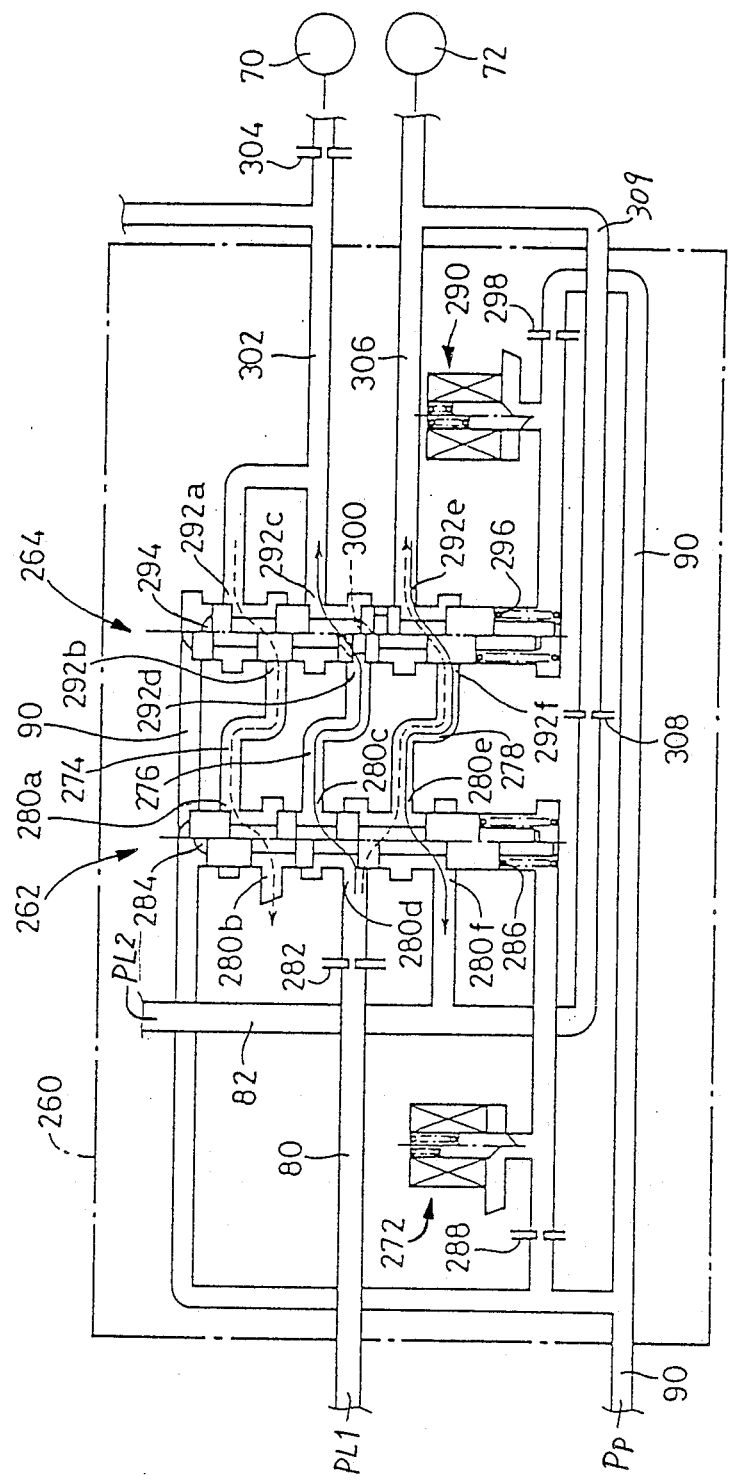
FIG. 9 is a view showing in detail an arrangement of a shift control valve device shown in FIG. 2, for the continuously variable transmission.

As shown in detail in FIG. 9, the shift-direction switching directional control valve 262 is a spool valve controlled by a first solenoid valve 272. This spool valve 262 has: ports 280a, 280c and 280e which communicate respectively with three connecting passages, i.e., first, second and third connecting passages 274, 276, 278 which connect the instant directional control valve 262 to the shift-speed control flow control valve 264; a drain port 280b which communicates with the drain; a port 280d to which the first line pressure PL1 is applied through a restrictor 282; a port 280f to which the second line pressure PL2 is applied; a valve spool 284 which is slidably movable between a first position (upper stroke end as indicated in FIG. 9, by the right half of the spool) and a second position (lower stroke end as indicated in FIG. 9, by the left half of the spool); and a spring 286 which biases the spool 284 in a direction toward the first position. One of opposite ends of the spool 284 is always exposed to the pilot pressure Pp, while the other end (lower end as seen in FIG. 9) is exposed to the pilot pressure Pp only when the first solenoid valve 272 is off, i.e., in its closed position. While the solenoid valve 272 is on or in its open position, the pilot pressure Pp is released to the drain through the valve 272, which is located downstream of a restrictor 288. In the open position of the solenoid valve 272, therefore, the pilot pressure Pp does not act on the lower end of the spool 284. Accordingly, while the first solenoid valve 272 is on, the spool 284 is placed in the second position in which the port 280a and the drain port 280b are disconnected from each other while the ports 280d and 280e are disconnected from each other. At the same time, the ports 280c and 280d communicate with each other, while the ports 280e and 280f communicate with each other. While the solenoid valve 272 is off, the spool 284 is placed in the first position in which the port 280a and the drain port 280b communicate with each other while the ports 280e and 280d communicate with each other. At the same time, the ports 280c and 280d are disconnected from each other while the ports 280e and 280f are disconnected from each other. The directional control valve 262 is constructed such that the fluid communication between the appropriate two ports 280a-280f occurs while the ports are partially closed by the appropriate lands of the spool 284. This arrangement shortens the operating stroke of the spool 284, thereby improving the operating response of the valve 262. The relatively short operating stroke of the spool 284 does not cause a problem in operation, since the cross sectional areas of the ports 280a-280f are determined so as to permit sufficient amounts of flow of the fluid through the partially open ports.

The shift-speed control flow control valve 264 is a spool valve controlled by a second solenoid valve 290. This spool valve 264 includes: ports 292b, 292d and 292f which communicate respectively with the first, second and third connecting passages 274, 276, 278 indicated above; ports 292a and 292c which communicate with the input side hydraulic cylinder 70; a port 292e which communicates with the output side hydraulic cylinder 72; a valve spool 294 which is slidably movable between a first position (upper stroke end as indicated in FIG. 9, by the left half of the spool) and a second position (lower stroke end as indicated in FIG. 9, by the right half of the spool); and a spring 296 which biases the spool 294 toward the first position. As in the directional control valve 262, one of opposite ends of the spool 294 is always exposed to the pilot pressure Pp, while the other end (lower end as seen in FIG. 9) is exposed to the pilot pressure Pp only when the second solenoid valve 290 is off. While the solenoid valve 290 is on or in its open position, the pilot pressure Pp is released to the drain through the valve 290, which is located downstream of a restrictor 298. In the open position of the solenoid valve 290, therefore, the pilot pressure Pp does not act on the lower end of the spool 294. Accordingly, while the second solenoid valve 290 is on (duty cycle=100%), the spool 294 is placed in the second position in which the ports 292a and 292b communicate with each other. At the same time, the ports 292c and 292d communicate with each other, while the ports 292e and 292f communicate with each other. While the solenoid valve 290 is off (duty cycle=0%), the spool 294 is placed in the first position in which the communictions between the ports 292a and 292b, between the ports 292c and 292d, and between the ports 292e and 292f are interrupted.

While the second solenoid valve 290 is off, the ports 292c and 292d are disconnected from each other. However, these two ports 292c, 292d only slightly communicate with each other, through a restrictor hole 300 formed through the spool 294. Further, the input side hydraulic cylinder 70 communicates with the ports 292a and 292c, through an input side passage 302 provided with a restrictor 304. The output side hydraulic cylinder 72 communicates with the port 292e through an output side passage 306, and with the second pressure line 82 through a by-pass passage 309 provided with a restrictor 308. Like the directional control valve 262, the flow control valve 264 is constructed such that the fluid communication between the appropriate two ports 292a-292f occurs while the ports are partially closed by the appropriate lands of the spool 294. Thus, the operating stroke of the spool 294 is made relatively short.

Accordingly, while the first solenoid valve 272 is in the on state, the fluid in the first pressure line 80 is fed into the input side hydraulic cylinder 70, through the restrictor 282, ports 280d and 280c, second connecting passage 276, ports 292d and 292c, input side passage 302 and restrictor 304, as indicated in solid line in FIG. 9. In the meantime, the fluid in the output side hydraulic cylinder 72 is discharged through the output side passage 306, ports 292e and 292f, third connecting passage 278, and ports 280e and 280f, as also indicated in solid line in FIG. 9. Consequently, the first line pressure PL1 in the first pressure line 80 acts on the input side hydraulic cylinder 70, while the second line pressure PL2 in the second pressure line 82 acts on the output side hydraulic cylinder 72. As a result, the equilibrium between the thrusts of the two cylinders 70, 72 is lost, whereby the CVT 16 is shifted in a direction to increase the speed ratio "e" (in the speed-ratio increasing direction), namely, the speed ratio "e" is increased.

While the first solenoid valve 272 is in the off state, on the other hand, the fluid in the first pressure line 80 is fed into the output side hydraulic cylinder 72 through the restrictor 282, ports 280d and 280e, third connecting passage 278, ports 292f and 292e and output side passage 306, while the fluid in the input side hydraulic cylinder 70 is discharged through the restrictor 304, input side passage 302, ports 292a and 292b, first connecting passage 274, port 280a and drain port 280b, as indicated in broken line in FIG. 9. Consequently, the first line pressure PL1 in the first pressure line 80 acts on the output side hydraulic cylinder 72, while the considerably low pressure acts on the input side hydraulic cylinder 70. As a result, the equilibrium between the thrusts of the two cylinders 70, 72 is lost, whereby the CVT 16 is shifted in a direction to decrease the speed ratio "e" (in the speed-ratio decreasing direction), namely, the speed ratio "e" is decreased.

As described above, the fluid communications between the ports 292a and 292b, between the ports 292c and 292d and between the ports 292e and 292f are permitted or interrupted in response to the on/off operations of the second solenoid valve 290, whereby the flows of the fluid as indicated in solid and broken lines in FIG. 9 are controlled between a non-restricted state and a restricted state. Therefore, the CVT 16 is shifted at a high rate or a low rate, in the speed-ratio decreasing or speed-ratio increasing direction. That is, the speed ratio "e" is rapidly or slowly decreased or increased. Further, the valve spool 294 is placed in an intermediate position thereof when the second solenoid valve 290 is alternately turned on and off (operated in a duty cycle control mode). In this case, the CVT 16 is shift up or down at an intermediate rate. A table in FIG. 10 indicates shift-up and shift-down motions of the CVT 16 at the three different rates, in relation to the operating conditions of the first and second solenoid valves 272 and 290. When the first solenoid valve 272 is on while the second solenoid valve 290 is off, the fluid in the first pressure line 80 is supplied to the input side hydraulic cylinder 70 through the restrictor hole 300 in the spool 294, while the fluid in the output side hydraulic cylinder 72 is discharged into the second pressure line 82 through the restrictor 308. When the first and second solenoid valves 272, 290 are both off, the fluid in the second pressure line 82 is supplied to the output side hydraulic cylinder 72 through the restrictor 308, while the fluid in the input side hydraulic cylinder 70 is discharged through a small amount of clearance provided between the sliding surfaces of the piston and cylinder block. The restrictor 308 is provided to avoid a decrease in the pressure Pout in the output side hydraulic cylinder 72, when the CVT 16 is shifted to decrease the speed ratio "e", with the pressue Pout higher than the pressure Pin in the input side hydraulic cylinder 70.

It follows from the above description that the CVT 16 is shifted in the speed-ratio decreasing direction at a relatively low rate when the first and second solenoid valves 272, 290 are both turned off. Therefore, even if the first and second solenoid valves 272, 290 were turned off by an electronic control unit 350 (which will be described) due to short-circuiting of a solenoid of the first or second solenoid valve 272, 290 during running of the vehicle, a rapid change of the speed ratio "e" of the CVT 16 would not occur due to such a short-circuiting trouble. Thus, the above arrangement assures a safe running of the vehicle. Further, since the CVT 16 is shifted down at a low rate in the event of the accidental turning off of the two solenoids, the vehicle can be decelerated and stopped on the roadside, and can be re-started for a repair shop.

Figure 12:
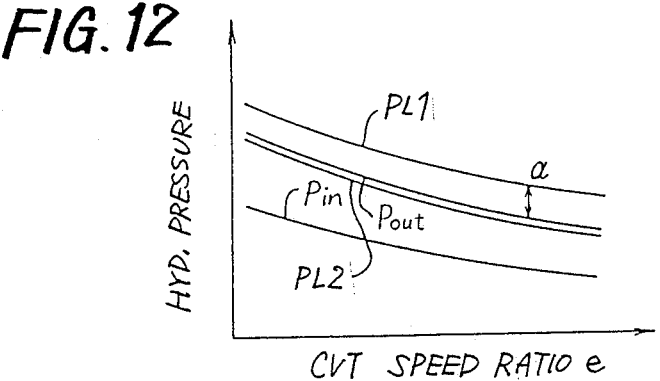
Figure 13:
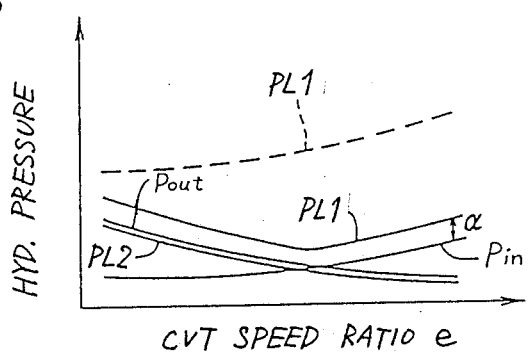

It is desirable that the first line pressue PL1 for the CVT 16 be changed with the speed ratio "e" of the CVT 16, as indicated in FIG. 11 when the vehicle runs in a positive-torque condition (wherein the torque is transmitted from the input shaft 38 to the output shaft 54), or as indicated in FIG. 12 when the vehicle runs in an engine-brake condition (wherein the torque is transmitted from the output shaft 54 to the input shaft 38). The curves of the graphs in FIGS. 11 and 12 indicate the required pressure levels when the speed ratio "e" of the CVT 16 is changed over its entire range, where the input shaft 38 is rotated with a constant torque. In the present embodiment wherein the pressure receiving areas of the input and output side hydraulic cylinders 70, 72 are substantially the same, the pressure Pin in the input side hydraulic cylinder 70 is larger than the pressure Pout in the output side hydraulic cylinder 72 when the vehicle runs in the positive-torque condition, as indicated in FIG. 11, and the pressure Pout is larger than the pressure Pin when the vehicle runs in the engine-brake condition, as indicated in FIG. 12. In either case, the pressure in the hydraulic cylinder 70, 72 which is on the driving side is larger than that in the hydraulic cylinder on the driven side. Since the pressure Pin in the positive-torque condition produces a thrust in the cylinder on the driving side, it is desirable that the first line pressure PL1 be higher than the pressure Pin by an extra value which is a required minimum for giving the thurst to the driving side cylinder to establish a desired speed ratio "e", and for minimizing the power loss. However, it is impossible to adjust the first line pressure PL1 as indicated in FIGS. 11 and 12, solely by the pressure in one of the two cylinders 70, 72. Therefore, the present hydraulic control device is provided with the switch valve 170 described above, in order to apply the higher one of the pressures Pin and PL2 to the first pressure regulating valve 100. This is also required when the first line pressure PL1 is adjusted to a level which is higher than the higher one of the pressures Pin and Pout (almost equal to the second line pressure PL2), by an extra amount α, where the vehicle runs with the CVT 16 placed in a non-load condition in which a curve indicative of the pressure Pin and a curve indicative of the pressure Pout intersects each other, as indicated in FIG. 13.

The switch valve 170 has a common port 312 which communicates with the first pressure regulating valve 100 through a restrictor 310; a first port 314 which communicates with the input side passage 302; a second port 316 which communicates with the second pressure line 82; a valve spool 318 which is movable between a first position for connection of the common port 312 to the first port 314, and a second position for connection of the common port 312 to the second port 316; and a spring 320 for biasing the spool 318 toward the second position. The opposite ends of the spool 318 receive the pressure Pin in the input side hydraulic cylinder 70 and the second line pressure PL2, respectively, so that the spool 318 is moved toward one of the first and second positions, so as to apply the higher one of the pressures Pin and PL2 to the chamber 160 of the first pressure regulating valve 100. Described more precisely, the pressure Pin is applied to the chamber 160 when a thrust based on the pressure Pin exceeds a sum of a thrust based on the second line pressure PL2 and a thrust of the spring 319. It is noted that the thrust (biasing force) of the spring 319 is very small.

As described above, the switch valve 170 is adapted to apply the higher one of the pressures Pin (pressure in the input side hydraulic cylinder 70) and PL2 (second line pressure) to the chamber 160 of the first pressure regulating valve 100 as a feedback pressure. This arrangement is advantageous in the following situation. That is, upon stopping of the vehicle with the CVT 16 shifted down to obtain the lowest speed ratio "e", the pressure Pin in the input side hydraulic cylinder 70 is released through the drain port 280b, and the pressures Pin and Pout in the input and output side hydraulic cylinders 70, 72 are lowered to extremely low levels. In this event, the first pressure regulating valve 100 operates to establish the first line pressure PL1 based on the second line pressure PL2, immediately after the engine 10 is re-started. Hence, the speed ratio "e" of the CVT 16 immediately after the re-start of the engine 10 to re-start the vehicle can be adequately controlled. Further, since the higher one of the pressures Pin and PL2 is utilized as a feedback pressure applied to the chamber 160 of the first pressure regulating valve 100, the first line pressure PL1 can be adjusted to a level which is higher by a relatively small extra amount $\alpha$ than the pressure Pin, or than the pressure Pout (almost equal to the second line pressure PL2), as indicated in FIG. 13. Thus, the first line pressure PL1 is controlled to be a required minimum level, so as to minimize a power loss of the hydraulic system. A curve indicated in dashed line in FIG. 13 shows the first line pressure PL1 where the switch valve 170 was not provided. In this case, the first line pressure PL1 is higher by an unnecessarily large extra amount than actually required, while the speed ratio "e" is relatively low.

The extra amount $\alpha$ indicated above is determined to a required minimum value that permits the CVT 16 to be shifted to change its speed ratio "e" to a suitable value at a suitable rate, over the entire range of the speed ratio. It will be understood from the equation (2) given above that the first line pressure PL1 is controlled to be higher than the pressure Pin or Pout, by a suitable extra amount $\alpha$, which is determined based on the THROTTLE pressure Pth. That is, the areas of the pressure receiving surfaces of the first pressure regulating valve 100 and the biasing force of the spring 144 are determined so that the first line pressure PL1 is determined as described above. As indicated in FIG. 14, the first line pressure PL1 controlled by the first pressure regulating valve 100 increases with the pressure Pin or Pout and the THROTTLE pressure Pth, and the upper limit of the pressure PL1 varies with the THROTTLE pressure Pth.

The above arrangement prevents an excessive rise of the first line pressure PL1 even if the pressure Pin in the input side hydraulic cylinder 70 is increased to bring the actual speed ratio "e" to a target speed ratio "e*", under a condition where a further decrease of the width of the V groove of the input pulley 56, i.e., a further movement of the movable rotor 66 is mechanically prevented with the actual speed ratio "e" reaching its maximum value, even though the first line pressure PL1 is higher than the pressure Pin by the extra amount $\alpha$. Described more specifically, the level of the first line pressure PL1 at point "A" in FIG. 14 is obtained from the following equation (3), which is expressed by the above equation (2) where the pressures Pin and PL2 are zero:

$$PL1 = [Pth (A5-A6) + W]/A4 \ldots \quad (3)$$

Figure 14:
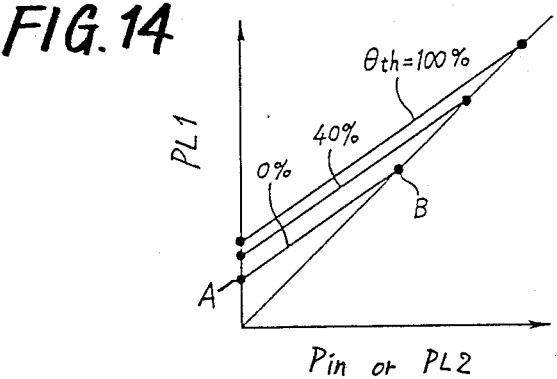
FIG. 14 is a graph illustrating a relationship between an output pressure of the first pressure regulating valve shown in FIG. 2, and a presure in the input side hydraulic cylinder of the continuously variable transmission, or a second line pressure of the system.

The level of the first line pressure PL1 at point "B" in FIG. 14 is expressed by the following equation (4), which is obtained from the equation (2) where Pin=PL1, which indicates the condition in which the width of the V groove of the input pulley 56 can no longer be decreased:

$$PL2 = [Pth (A5-A6) + W]/(A4-A6) \ldots \quad (4)$$

It follows from the above equation (4) that the first line pressure PL1 reaches the predetermined upper limit if the pressure receiving area A4 is larger than the pressure receiving area A6.

The first pressure regulating valve 100 is connected to a third pressure line 92 which is provided downstream of the first pressure line 80. Described more particularly, the fluid which flows from the port 148a (communicating with the first pressure line 80) to the port 148b, and the fluid which is delivered through the restrictor 320, are controlled by a third pressure regulating valve 322 to a third line pressure PL3 in the third pressure line 92. The third line pressure PL3 is suitably adjusted to activate the lock-up clutch 36 of the fluid coupling 12. The third pressure regulating valve 322 is a relief valve which includes a valve spool 324 and a spring 326. The spool 324 receives as a feedback pressure the third line pressure PL3 and is thus biased by this pressure PL3 toward its open position, and the spring 326 biases the spool 324 toward the closed position. The spool 324 is moved to an equilibrium position in which a thrust based on the above-indicated feedback pressure is balanced with a thrust of the spring 326. In this equilibrium position, the fluid in the third pressure line 92 is partially released from the third pressure regulating valve 322 and is fed through a restrictor 328 to various lubricating points of the power transmitting system for lubrication of the relevant parts. Thus, the third line pressure PL3 is produced. The fluid used for the lubrication is returned to the suction line 78.

The third line pressure PL3 controlled by the third pressure regulating valve 322 is supplied through a lock-up clutch control valve 330, selectively to a CLUTCH ENGAGE passage 332 and a CLUTCH RELEASE passage 334, so that the lock-up clutch 36 of the fluid coupling 12 is engaged and disengaged as needed. The lock-up clutch control valve 330 includes a valve spool 336, and a spring 338 for biasing the spool 336 in a direction to release the clutch 36. The spool 336 operates to effect selective connection of the third pressure line 92 with the CLUTCH ENGAGE and CLUTCH DISENGAGE passages 332, 334. The spool 336 receives the third line pressure PL3 at its opposite ends. The spool 336 is moved in the direction to release the lock-up clutch 36 when a third solenoid valve 340 is off or in its closed position. The lock-up clutch control valve 330 as shown in FIG. 2 is placed in this condition. When the third solenoid valve 340 is turned on and opened, the fluid in the third pressure line 92 is released through the solenoid valve 340, which is disposed downstream of a restrictor 342, whereby the third line pressure PL3 which has been applied to a chamber 344 formed on one end of the spool 336 on the side of the spring 338 is removed, and consequently the spool 336 is moved in a direction that causes the lock-up clutch 36 to be engaged. A portion of the fluid supplied to the lock-up clutch control valve 330 is supplied to a cooling unit of the power transmitting system. The pressure of this fluid is controlled by a cooler by-pass valve 346. Reference numeral 348 in FIG. 2 designates a safety valve for preventing an excessive rise of the first line pressure PL1.

The electronic control unit 350 shown in FIG. 1 serves as control means for controlling the first, second and third solenoid valves 272, 290 and 340 of the hydraulic control device of FIG. 2, so that the speed ratio "e" of the CVT 16 and the engagement of the lock-up clutch 36 of the fluid coupling 12 are controlled. The control unit 350 comprises a so-called microcomputer which includes a central processing unit (CPU), a random-access memory (RAM) and a read-only memory (ROM). The control unit 350 receives: a signal indicative of a speed Ne of the engine 10, from an engine speed sensor 352; a signal indicative of a rotating speed Nin of the input shaft 38 of the CVT 16, from an input shaft speed sensor 354; a signal indicative of a rotating speed Nout of the output shaft 54 of the CVT 16, from an output shaft speed sensor 356; a signal indicative of the throttle opening angle θth, from a throttle opening sensor 358; and a signal indicative of a currently selected operating position Ps of the shift lever 252, from a shift-lever position sensor 360. The CPU of the control unit 350 processes the received various signals according to a control program stored in the ROM, while utilizing a temporary data storage function of the RAM, and generates output drive signals for controlling the first, second and third solenoid valves 270, 290 and 340.

The electronic control unit 350 is adapted to execute a main routine (not shown) which includes an initializing step, and a data reading step for storing in the RAM the input signals received from the various sensors. Based on the input signals stored in the RAM, the CPU calculates various parameters such as the rotating speed Nin of the input shaft 38, the rotating speed Nout of the output shaft 54, the speed ratio "e" of the CVT 16 and a running speed "v" of the vehicle. The control unit 350 sequentially or selectively performs various control operations for controlling the lock-up clutch 36, CVT 16, and other members of the power transmitting system.

Figure 15:
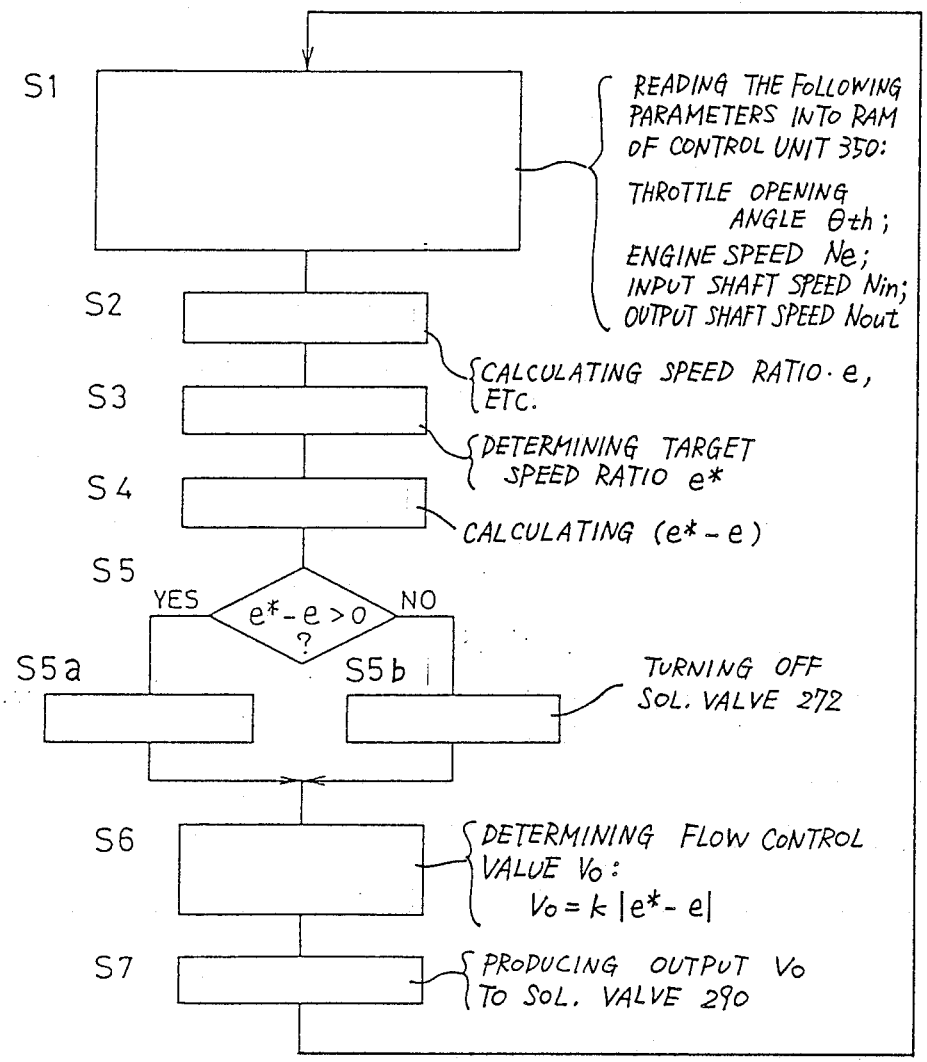
FIG. 15 is a flow chart illustrating an operation of the electronic control unit shown in FIG. 1.

An example of the control operation for the CVT 16 is illustrated in the flow chart of FIG. 15, wherein the CPU first executes step S1 in which the various input signals are stored in the RAM, and the speed Ne of the engine 10, speeds Nin and Nout of the input and output shafts 38, 54, throttle opening angle θth and other parameters are calculated based on the stored input signals. Step S1 is followed by step S2 in which the speed ratio "e" of the CVT 16, running speed "v" of the vehicle and other parameters are calculated based on the input signals. Then, the control flow goes to step S3 to determine a target speed ratio "e*" of the CVT 16, based on the calculated throttle opening angle θth and vehicle running speed "v", according to a predetermined relationship among these three parameters. This relationship is determined so as to assure sufficient drivability of the vehicle with a minimum fuel consumption by the engine 10. For instance, the relationship is determined so that a currently required output of the engine 10 represented by the throttle opening angle θth is obtained on an ideal v-Nin* curve which permits a minimum fuel consumption by the engine 10. Namely, the target engine speed Nin* (desired speed of the input shaft 38 of the CVT 16) is determined by the vehicle running speed "v" and the throttle opening angle θth, and according to the predetermined relationship. Eventually, the target speed ratio "e*" to obtain the determined target engine speed Nin* is determined. The predetermined relationship is stored in the ROM, in the form of a functional formula or data map. In the present embodiment, a plurality of such relationships are stored in the ROM and are selectively used depending upon the currently selected operating position (D or S) of the shift lever 252.

Then, the control flow goes to step S4 to calculate a speed-ratio control error, i.e., a difference ("e*"−"e"), and then to step S5 to determine whether the calculated speed-ratio control error ("e*"−"e") is a positive value or not. The control flow then goes to step S5a or S5b depending upon the determination in step S5, in order to change the actual speed ratio "e" of the CVT 16 so as to zero the control error ("e*"−"e"). Described more specifically, if a positive decision (YES) is obtained in step S5, step S5a is executed to turn on the first solenoid valve 272 and thereby shift up the CVT 16 to increase its actual speed ratio "e". If a negative decision (NO) is obtained in step S5, step S5b is implemented to turn off the first solenoid valve 272 and thereby shift down the CVT 16 to decrease the actual speed ratio "e".

Subsequently, the control flow goes to step S6 in which a flow control value Vo for controlling the second solenoid valve 290 is determined, for example, according to the following equation (5):

$$Vo = k|e^* - e| \ldots \quad (5)$$

In the following step S7, a drive signal represented by the determined flow control value Vo is applied to the second solenoid valve 290. For example, this drive signal is an ON/OFF signal for continuously changing the duty cycle of the second solenoid valve 290 at a predetermined frequency. With the above-indicated steps repeatedly executed, the actual speed ratio "e" of the CVT 16 is maintained at an optimum value depending upon the running condition of the vehicle.

While the control operation for the lock-up clutch 36 is not illustrated, the control unit 350 is adapted to operate the lock-up clutch 36 to the engaged position when the vehicle running speed "v" reaches a predetermined value, for instance, 30 Km/h.

As described hitherto, the instant hydraulic control device provides the first and second line pressures PL1 and PL2 controlled by the respective first and second pressure regulating valves 100 and 102, so that a fluid pressure corresponding to the first line pressure PL1 is applied to one of the input and output side hydraulic cylinders 70, 72, while the fluid in the other hydraulic cylinder 70, 72 is discharged into the second pressure line 80 or the drain. Accordingly, the thrust ratio of the two hydraulic cylinders 70, 72 can be varied over a sufficiently wide range, without having to provide the input side hydraulic cylinder 70 with a comparatively large pressure receiving area. This eliminates deterioration of the drivability of the vehicle which would arise if the pressure receiving surface of the hydraulic cylinder 70 has a comparatively large area.

Further, the first pressure regulating valve 100 is operated in relation to the currently required output of the engine 10 (i.e., throttle opening angle $\theta$th), so that the first line pressure PL1 is regulated to a required minimum value, so as to provide a sufficiently high rate (de/dt) of change of the speed ratio "e" and to keep the hydraulic power loss to a minimum. On the other hand, the second pressure regulating valve 102 is operated in relation to the actual speed ratio "e" and the transmission torque (almost proportional to the throttle opening angle $\theta$th), so that the second line pressure PL2 is controlled to be a minimum level required to give the belt 60 a suitable tension or to prevent a slip of the belt 60. Thus, the instant hydraulic control device significantly reduces the power loss of the vehicle associated with the operation of the oil pump 74.

Moreover, the CVT shift control valve device 260 is less likely to be influenced by iron particles, dirts and other foreign matters contained in the working fluid, than a control valve device employing a linear solenoid, because the valve device 260 consists of the directional control valve 262 which has two stable positions, and the flow control valve 264 which has three stable positions (two stroke end positions, and an intermediate position between the stroke end positions). Thus, the valve device 260 has improved operating reliability. Furthermore, the instant valve device 260 is available at a comparatively low cost, in the absence of a linear solenoid, or otherwise required high machining accuracy for assuring smooth movement of the valve spools.

It is also noted that the first line pressure PL1 is controlled to a required minimum level even during a running of the vehicle with the CVT 16 held in the non-load condition, because the first line pressure PL1 is adjusted based on the throttle opening angle $\theta$th, and on the higher one of the pressure Pin in the input side hydraulic cylinder 70 and the second line pressure PL2, as indicated in FIG. 13.

The instant embodiment is also advantageous in that the first line pressure PL1 adjusted by the first pressure regulating valve 100 according to the equation (2) above will not exceed an upper limit which is determined in relation to the throttle opening angle 0 th and the pressure Pin in the input side hydraulic cylinder 70. Consequently, the first line pressure PL1 will not rise excessively even if a further decrease of the width of the V groove of the input pulley 56 is mechanically inhibited before the speed-ratio control error ("e*"—"e") is zeroed.

In the illustrated hydraulic control device, the first pressure regulating valve 100 for controlling the first line pressure PL1 is an overflow type, while the second pressure regulating valve 102 for controlling the second line pressure PL2 is a pressure reducing type adapted to reduce the first line pressure PL1 to the second line pressure PL2. Further, the third pressure regulating valve 322 for controlling the third line pressure PL3 is an overflow type adapted to adjust the fluid overflowing from the first pressure regulating valve 100 into the third line pressure PL3. In this hydraulic arrangement, the first line pressure PL1 is less likely to be influenced by the second line pressure PL2, than in a hydraulic arrangement wherein first and second pressure regulating valves of a pressure reducing type are connected in series. Namely, the first and second pressure regulating valves 100, 102 are capable of adjusting the first and second line pressures PL1 and PL2, independently of each other. Therefore, the first line pressure PL1 can be maintained at a required minimum level, whereby the hydraulic power loss is minimized.

Also, the instant hydraulic control device is advantageous in its operation upon re-starting of the engine 10. Namely, the switch valve 170 connected to the input side hydraulic cylinder 70 and the second pressure line 82 is adapted to apply to the first pressure regulating valve 100 the higher one of the pressure Pin in the cylinder 70 and the second line pressure PL2. The first pressure regulating valve 100 is adapted to adjust the first line pressure PL1 to a level which is higher by a suitable amount than the pressure received from the switch valve 170. Hence, even if the pressures Pin and Pout in the hydraulic cylinders 70, 72 are lowered due to a flow of the fluid from the hydraulic cylinder 70 through the drain port 280b upon re-starting of the engine 10, the second line pressure PL2 is immediately applied by the switch valve 170 to the chamber 160 of the first pressure regulating valve 100, whereby the first line pressure PL1 can be normally controlled by the regulating valve 100 to a suitable level. Thus, the instant hydraulic control device permits an adequate operation for controlling the CVT 16 with a sufficiently high response, when the vehicle is started following the re-starting of the engine 10 indicated above.

In addition, the spring 319 provided in the switch valve 170 to bias the spool 318 toward its second position provides an advantage that the second line pressure PL2 can be more quickly applied to the first pressure regulating valve 100 when the engine 10 is re-started while the input side hydraulic cylinder 70 is drained through the drain port 280b. However, the spring 319 may be eliminated.

Figure 17:
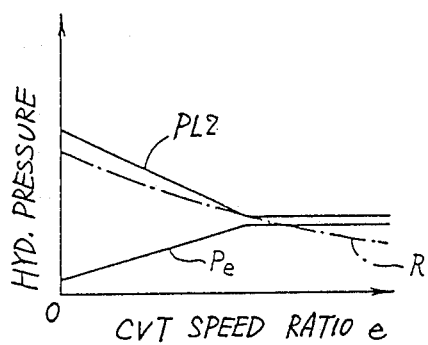
FIG. 17 is a graph indicating a relationship beetween the output characteristic and an ideal pressure curve of the second pressure regulating valve of FIG. 2.
Figure 18:
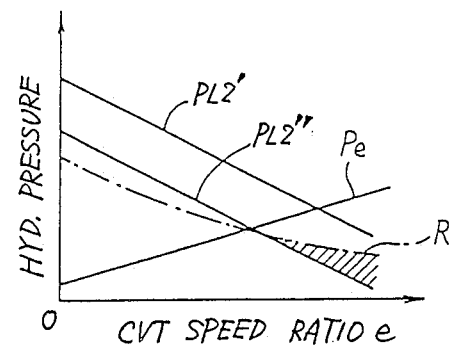
FIG. 18 is a graph corresponding to that of FIG. 17, where a limit valve is not provided.

In the present embodiment, the SPEED-RATIO pressure Pe generated by the speed-ratio sensing valve 182 is limited by the limit valve 210 in relation to the THROTTLE pressure Pth, as indicated in FIG. 6. Accordingly, the second line pressure PL2 can be controlled so as to approximate to an ideal curve R shown in FIG. 17, which assures an optimum tension of the transmission belt 60. This arrangement effectively eliminates otherwise possible reduction in the durability of the CVT due to excessive tensioning of the belt 60, or slipping of the belt 60. If a conventional pressure regulating valve having a characteristic of linearly changing the second line pressure PL2 with the CVT speed ratio "e" is used, the second line pressure as indicated at PL2' in FIG. 18 tends to be considerably higher than an optimum level represented by the ideal curve R shown in FIG. 18, when the speed ratio "e" is relatively low, if the pressure regulating valve is calibrated to a relatively high range of the speed ratio "e". As a result, the tension of the transmission belt 60 (force which acts on the belt 60) becomes unnecessarily large. If the pressure regulating valve is calibrated to a relatively low range of the speed ratio "e", on the other hand, the second line pressure as indicated at PL" in FIG. 18 tends to be considerably lower than the optimum level, as indicated by a hatched area in the same figure, when the speed ratio "e" is relatively high. In this case, the belt 60 may slip on the pulleys 56, 58.

In the embodiment described above, the electronic control unit 350 is adapted such that no drive signals are applied to the solenoids of the first and second solenoid valves 272, 290, upon short-circuiting of these solenoids, and therefore the two solenoid valves 270, 290 are both held off, whereby the CVT 16 is slowly shifted down in such an abnormal condition. In other words, a rapid change in the speed ratio "e" of the CVT 16 is prevented to assure safe running of the vehicle, upon short-circuiting of the solenoids or other electrical troubles. In addition, the slow decrease of the speed ratio "e" to the minimum value (slow shift-down of the CVT 16 to its extreme low gear position) makes it possible to start the vehicle to bring it to a service shop after the vehicle is once stopped on the roadside.

Also, the instant hydraulic control device employs the first, second and third connecting passages 274, 276 and 278 which connect the shift-direction switching directional control valve 262 and the shift-speed control flow control valve 264. As indicated in FIG. 9, the first connecting passage 274 is used primarily for discharging the fluid from the input side hydraulic cylinder 70 for shifting down the CVT 16, while the second connecting passage 276 is used primarily for feeding the fluid into the same cylinder 70 for shifting up the CVT 16. According to this arrangement, the maximum rates at which the CVT 16 is shifted up and down can be determined independently of each other. When a rapid decrease of the speed ratio "e" is desired, the fluid can be rapidly discharged from the hydraulic cylinder 70 through the drain port 280b, whereby the speed ratio can be decreased at a high rate upon stopping of the vehicle. On the other hand, a desired high rate of increase of the speed ratio "e" can be obtained by adjusting the flow resistance of the second connecting passage 276 (by adjusting the inside diameter and length of the passage 276, or a diameter of a restrictor provided in the passage).

In the instant hydraulic control device, the second and third pressure lines 82 and 92 are disposed downstream of the first pressure line 80, and in parallel with each other. Accordingly, even if the second line pressure PL2 adjusted by the second pressure regulating valve 102 falls below the third line pressure PL3, the pressure PL2 is not be limited to the third line pressure PL3 but is controlled to an optimum value for maintaining a suitable amount of tension of the belt 60. Hence, it is possible to avoid an excessive rise of the first line pressure PL1 due to an unnecessarily high level of the second line pressure PL2. Thus, the hydraulic power loss can be minimized. Since the speed ratio "e" of the CVT 16 is stabilized when the thrusts of the two cylinders 70, 72 are balanced, the first line pressure PL1 applied to the high-pressure cylinder 70, 72 is raised as the second line pressure PL2 applied to the low-pressure cylinder 70, 72 is raised. Therefore, an excessive rise of the second line pressure PL2 leads to an increased power loss of the hydraulic system associated with the operation of the oil pump 74.

The instant hydraulic control circuit can be simple in construction in the absence of any circuit components such as a flow divider, because of the types of the first, second and third pressure regulating valves 100, 102 and 322. That is, the first pressure regulating valve is an overflow or pressure relief type which adjusts the first line pressure PL1 by varying an amount of overflow or release of the fluid therefrom, and the second pressure regulating valve 102 is a pressure reducing type which adjusts the second line pressure PL2 by reducing the first line pressure PL1. The third pressure regulating valve 322 is a pressure relief type which adjusts the third line pressure PL3 by releasing the fluid therefrom to the drain. If the second pressure regulating valve 102 is also a pressure relief type, a flow divider is required between the first pressure regulating valve 100 and the second and third pressure regulating valves 102, 322, in order to avoid influences of the second and third line pressures PL2 and PL3 upon each other.

In the first pressure regulating valve 100, the area A4 of the surface of the spool 140 which receives the first line pressure PL1 (as a feedback pressure) in the speed-ratio decreasing direction is smaller than the area A6 of the surface of the spool 140 which receives the higher one of the pressure Pin (in the input side hydraulic cylinder 70) and the second line pressure PL2 (almost equal to the pressure Pout) in the speed-ratio increasing direction. Accordingly, an influence of the feedback pressure acting on the surface area A4 upon the first line pressure PL1 to be controlled is greater than that of the pressure acting on the surface area A6. Therefore, the first line pressure PL1 controlled by the first pressure regulating valve 100 will not exceed a predetermined upper limit, even if the pressure acting on the surface area A6 becomes equal to the first line pressure PL1 when the pressure Pin in the input side hydraulic cylinder 70 becomes equal to the first line pressure PL1 while a movement of the movable rotor 66 of the input pulley 56 is mechanically prevented. In other words, the first line pressure PL1 will not rise beyond the predetermined upper limit, even if the movable rotor 66 of the pulley 56 is prevented from being moved to control the speed ratio of the CVT 16. Thus, the instant hydraulic circuit arrangement does not require a valve to avoiding an excessive rise of the first line pressure PL1, and can therefore be simple in construction.

Some modified embodiments of the present invention will be described below. In the interest of brevity and simplification, the same reference numerals as used in the preceding embodiment will be used to identify the corresponding components, and redundant description of these components will not be provided.

Figure 16:
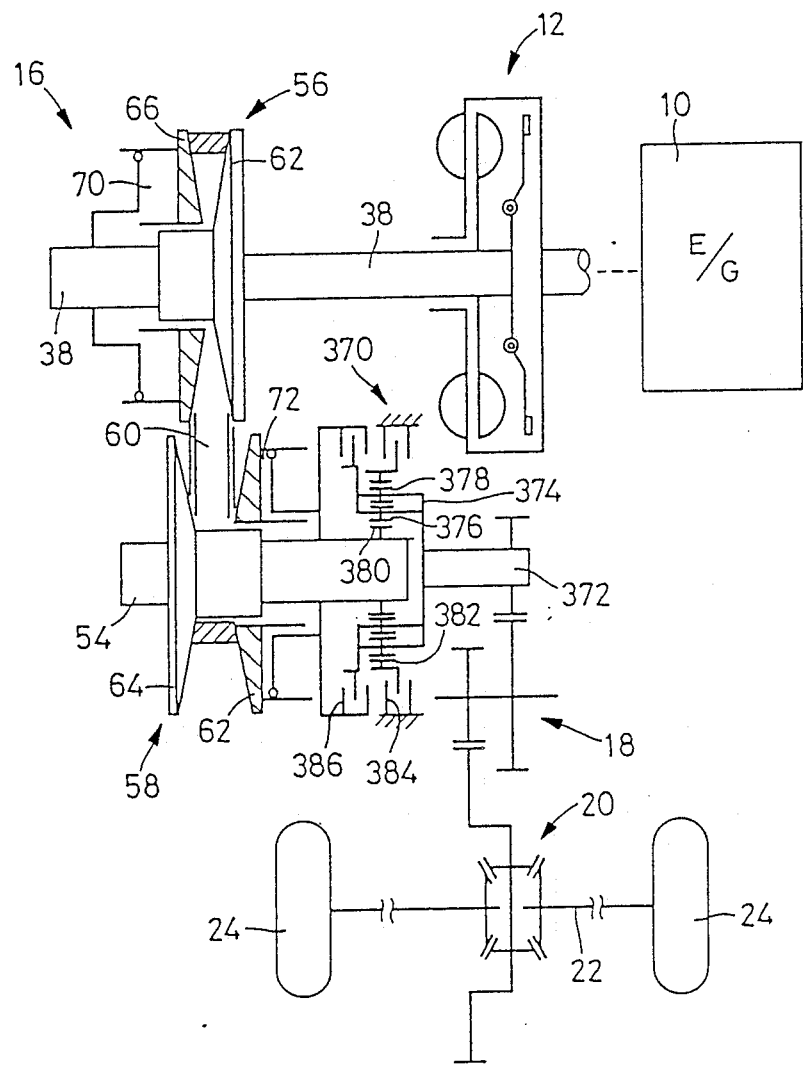
FIG. 16 is a schematic view showing a modified power transmitting system which is controlled by the hydraulic control device of the invention.

While the auxiliary transmission 14 is disposed between the fluid coupling 12 and the input shaft 38 of the CVT 16, the auxiliary transmission may be disposed between the output shaft 54 of the CVT 16 and the intermediate gear device 18, as indicated at 370 in FIG. 16. As shown in the figure, the auxiliary transmission 370 is a double-pinion type planetary gear mechanism which includes: a pair of planetary gears 376, 378 which are rotatably supported by a carrier 374 fixed to an intermediate shaft 372 provided coaxially with the output shaft 54; a sun gear 380 which is fixed to the output shaft 54 of the CVT 16 and which meshes with the internal planetary gear 376; a ring gear 382 which meshes with the external planetary gear 378; a REVERSE brake 384 for stopping rotation of the ring gear 382; and a FORWARD clutch 386 for connecting the carrier 374 and the output shaft 54 of the CVT 16.

Figure 19:
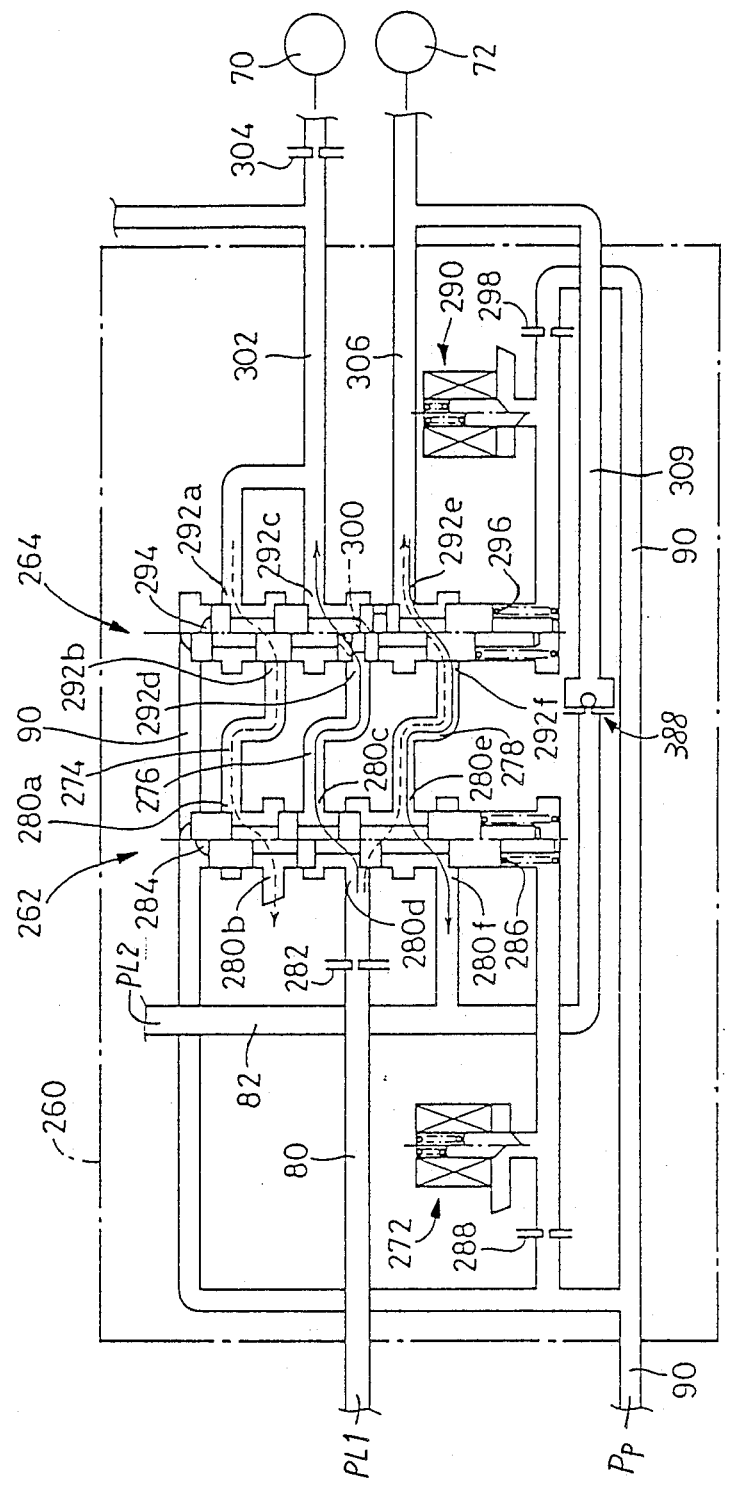
FIGS. 19 and 20 are views corresponding to that of FIG. 9, showing modified embodiments of the hydraulic control device of the invention.

While the by-pass passage 309 incorporating the restrictor 308 is provided between the second pressure line 82 and the output side hydraulic cylinder 72 in the first embodiment, the by-pass passage 309 may incorporate a check valve 388 equipped with a restrictor (restrictor/check valve 388), as illustrated in FIG. 19. This modified by-pass passage 309 is closed by the restrictor/check valve 388 when the CVT 16 is shifted up with the fluid flowing from the output side hydraulic cylinder 72. Consequently, the by-pass passage 309 does not function as a by-pass passage. Also in a normal shift-down operation of the CVT 16, the by-pass passage 309 is closed by the restrictor/check valve 388 since the pressure Pout in the output side hydraulic cylinder 72 is higher than the second line pressure PL2.

However, when the first and second solenoid valves 272 and 290 are both turned off to close the flow control valve 264, the fluid is supplied to the output side hydraulic cylinder 72 through the open by-pass passage 309, while the fluid gradually leaks from the input side hydraulic cylinder 70 through the clearance between the sliding surfaces of the cylinder block and the piston. As a result, the CVT 16 is slowly shifted down to decrease the speed ratio. In this manner, the by-pass passage 309 functions as a by-pass passage during a slow shift-down operation of the CVT 16. Therefore, no provisions are necessary for restraining a leak flow of the fluid from the output side hydraulic cylinder 72 into the second pressure line 82. The restrictor of the restrictor/check valve 388 may have a comparatively large diameter, so that the speed ratio can be decreased at a desired low rate, and so that the output side hydraulic cylinder 72 can be sufficiently supplied with the fluid.

In the present modified embodiment of FIG. 19 wherein by-pass passage 309 incorporating the restrictor/check valve 388 is provided between the output side hydraulic cylinder 72 and the second pressure line 82, the by-pass passage 309 is opened when the fluid flows from the second pressure line 82 toward the output side hydraulic cylinder 72, i.e., when the CVT 16 is shifted down in the direction to decrease its speed ratio. Therefore, the pressure Pout in the hydraulic cylinder 72 and the second line pressue PL2 can be made substantially equal to each other, while the flow control valve 264 is placed in the closed position in which the pressures Pout and PL2 otherwise tend to be different from each other. Thus, the instant arrangement enables the second pressure regulating valve 102 to accurately control the tension of the transmission belt 60 to an optimum level.

Further, since the by-pass passage 309 of the instant embodiment is opened in most cases when the CVT 16 is shifted down, it is possible to avoid an increase in the hydraulic power loss due to a leak flow of the fluid from the hydraulic cylinder 72 into the second pressure line 82, and to avoid a low rate of change of the speed ratio of the CVT 16 and consequent deterioration of the operating response. Even when the pressure Pout in the output side hydraulic cylinder 72 is lowered, the pressure Pout and the second line pressure PL2 can be almost equalized, by reducing the diameter of the restrictor of the restrictor/check valve 388. In other words, if the by-pass passage 309 is not provided with a check valve, i.e., if the by-pass passage 309 is provided with the restrictor 308 of FIG. 9 rather than the restrictor/check valve 388 of FIG. 19, the restrictor is required to perform two incompatible functions, namely, (1) a function of permitting the fluid to flow therethrough from the second pressure line toward the hydraulic cylinder 72 so as to equalize the pressure Pout in the cylinder 72 to the second line pressure PL2 when the pressure Pout becomes lower than the pressure Pin in the input side hydraulic cylinder 70, on the one hand, and (2) a function of restricting a rate of flow of the fluid therethrough to prevent a power loss of the fluid and improve the shifting response of the CVT 16 when the pressure Pout becomes higher than the pressure Pin, on the other hand.

Further, since the output side hydraulic cylinder 72 is replenished with the fluid supplied from the second pressure line 82 during a slow shift-down of the CVT 16, the belt 60 will not slip on the pulleys 56, 58 even if the amount of leakage of the fluid from the hydraulic cylinder 72 increases due to deterioration of the sealing member.

Figure 20:
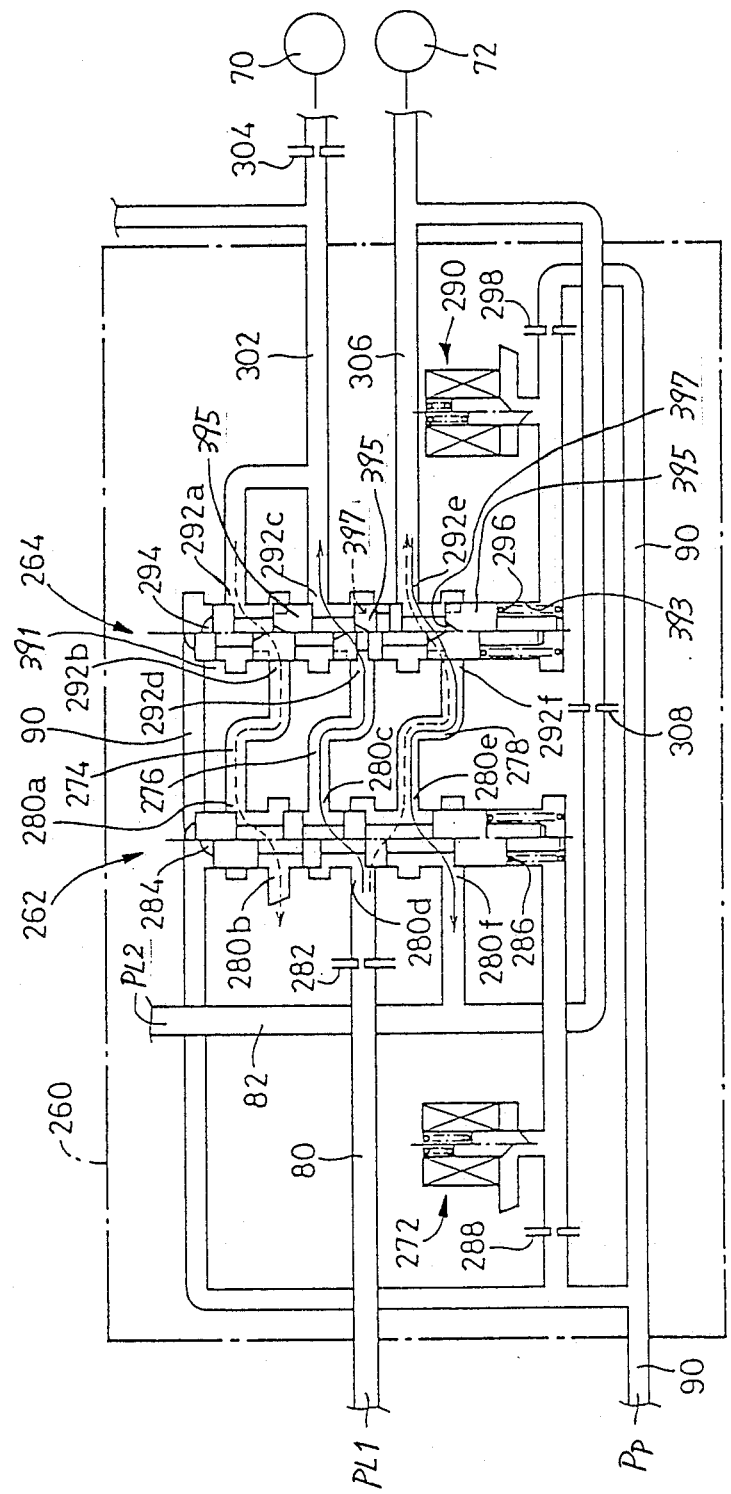

FIG. 20 shows a further modified embodiment of the present invention, in which the spool 294 of the shift-speed control flow control valve 264 is slidably received in a cylindrical bore 393 formed in a valve housing 391. The spool 294 is formed with a plurality of lands 395 for opening and closing the ports which communicate with the associated passages. Each of the lands 95 has a plurality of V-shaped notches 397 which modifies a relationship between the rate of flow of the fluid through the associated ports, and the distance of movement of the spool 294.

Described more specifically, the V-shaped notches 397 formed in the lands 395 of the spool 294 of the instant modified flow control valve 264 serve to permit a gradual, smooth increase in the rate of flow of the fluid through the associated ports as the spool 294 is axially moved from its fully closed position to its fully open position. Namely, the notches 397 assure a more proportional increase in the flow rate with the distance of movement of the spool 294, particularly when the amount of opening of the ports is relatively small, i.e., while the distance of movement of the spool 294 from its fully closed position is relatively small. Thus, the instant modified flow control valve 264 of the CVT shift control valve device 260 does not exhibit a sudden increase of the flow rate which occurs if the notches 397 would not be provided.

Figure 21:
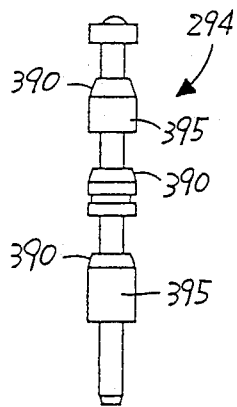
FIGS. 21-23 are views showing further embodiments of the invention.
Figure 22:
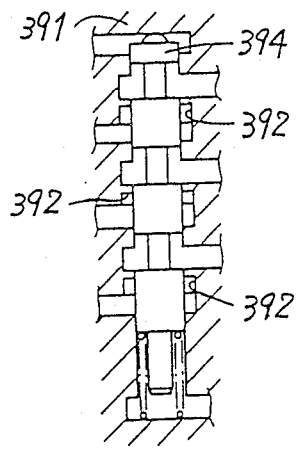
Figure 23:
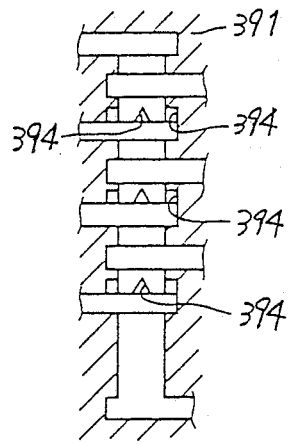

The V-shaped notches 397 provided in each land 395 of the spool 294 may be replaced by a chamferred end portion 390, as illustrated in FIG. 21. Further, the same effect as provided by the notches 397 of FIG. 20 or the chamferred end portion 390 of FIG. 21 may be offered by forming a plurality of V-shaped notches 392, 394 in respective parts of the inner circumferential surface of the cylindrical bore 393 on which the lands 395 slide, as illustrated in FIGS. 22 and 23. In these specific examples, four notches 392 (FIG. 21) or 394 (FIG. 22) are formed in the circumferential direction of the bore 393.

While the present invention has been described in its presently preferred embodiments with a certain degree of particularity, it is to be understood that the invention may be otherwise embodied.

For example, the directional control valve 262 and the flow control valve 264 wherein the opposite ends of the spools 284, 294 are exposed to the pilot pressure Pp, may be modified such that the springs 286, 296 are disposed on the upper end of the spools (as seen in FIG. 9) and such that the upper end of each spool 284, 294 is exposed to the atmospheric pressure.

Further, the first and second solenoid valves 272, 290 of the directional and flow control valves 262, 264 may be replaced by solenoids which directly act on the spools 284, 294 to control the axial movements thereof, as in an ordinary solenoid-operated control valve.

While the THROTTLE pressure Pth generated by the throttle-opening sensing valve 180 is used as a parameter representative of the currently required output of the engine 10, the THROTTLE pressure Pth may be replaced by a hydraulic pressure which represents an operating amount of an accelerator pedal of the vehicle if the vehicle does not have a throttle valve as in a diesel engine vehicle. In this case, for instance, the cam 184 used in the illustrated embodiments is mechanically linked with the accelerator pedal, such that the cam 184 is rotated with an increase in the operating amount of the pedal.

While the illustrated embodiments are adapted to control the CVT 16 such that the actual speed ratio "e" of the CVT 16 coincides with a determined target or desired speed ratio "e*", it is possible to control the CVT 16 such that the actual speed Nin of the input shaft 38 coincides with a determined target or desired speed Nin*.

Further, the pilot pressure Pp generated by the pilot pressure control valve 266 may be replaced by the third line pressure PL3. In this case, the valve 266 is eliminated, and the cost of the hydraulic control device is accordingly lowered.

In the illustrated embodiments, the switch valve 170 is adapted to apply to the first pressure regulating valve 100 the higher one of the pressure Pin in the input side hydraulic cylinder 70 and the second line pressure PL2. However, the pressure Pout in the output side hydraulic cylinder 72 may be used in place of the second line pressure PL2. In this case, the pressure Pout is applied to the second port 316 of the switch valve 170 through the output side passage 306.

The auxiliary transmission 14 may be modified to have a plurality of forward drive positions, rather than a single forward drive position provided in the illustrated embodiments.

The fluid coupling 12 may be replaced by an electromagnetic clutch, wet-type clutch or other types of couplings.

Although the limit valve 210 is adapted to determine the upper limit of the SPEED-RATIO pressure Pe depending upon the THROTTLE pressure Pth in the illustrated embodiment, the principle of the invention may be practiced even if the upper limit value of the pressure Pe is fixed. In this instance, the THROTTLE pressure Pth need not be applied to the plunger 212.

The embodiment of FIG. 19 may be modified such that the restrictor/check valve 388 is replaced by a restrictor and a separate check valve which are disposed in series connection with each other. In this case, the restrictor may be provided by determining the diameter and length of the by-pass passage 309 so that the passage 309 provides a suitable resistance to a flow of the fluid.

In the embodiment of FIG. 19, the by-pass passage 309 is provided between the output side hydraulic cylinder 72 and the second pressure line 82, so as to facilitate the adjustment of the tension of the belt 60 when the CVT 16 is slowly shifted down. However, another by-pass passage may be provided between the input side hydraulic cylinder 70 and the second pressure line 82, in addition to or in place of the by-pass passage 309. This additional by-pass passage incorporates a check valve which is closed when the pressure Pin in the input side hydraulic cylinder 70 becomes higher than the Pressure Pout in the output side hydraulic cylinder 72.

The embodiments of FIGS. 22 and 23 may be modified such that tapered recesses or cutouts are formed in the inner circumferential surface of the cylindrical bore 393, or such that the lands 395 or the inner surface of the bore 393 are formed with stepped recesses or cutouts. These stepped recesses provide the lands 395 with small-diameter portions, or provide the inner surface of the bore 393 with large-diameter portions.

Although the second pressure regulating valve 102 used in the illustrated embodiments is a pressure reducing type, it may be a pressure relief or overflow type. In this instance, the second pressure line 82 is connected to the first pressure regulating valve 100, so as to receive the pressure which is released from the valve 100.

Although the fluid whose pressure (third line pressure PL3) is adjusted by the third pressure regulating valve 322 is used for both the lubrication oil and the fluid for operating the lock-up clutch 36 in the illustrated embodiments, the fluid in question may be used for one of these two purposes, or for other purposes, for example as a pressure source for the fluid coupling.

While the second pressure regulating valve 102 of the illustrated embodiments is operated by hydraulic pressures, it may be a pressure control servo valve which is controlled by a computer (electronic control unit 350). In this case, the servo valve is controlled so as to provide the second line pressure according to an ideal curve, based on a signal indicative of the speed ratio "e" of the CVT 16, and a signal indicative of a parameter which represents the currently required output of the engine 10, such as the throttle opening angle, vacuum pressure in the suction pipe of the engine, or operating amount of the accelerator pedal.

While the THROTTLE pressure Pth produced by the throttle-opening sensing valve 180 is used as a pressure representative of the currently required output of the engine 10, this hydraulic signal Pth may be replaced by other hydraulic signals provided that the signals represent or closely relates to the output torque of the engine 10. For instance, a hydraulic pressure representative of the vacuum or reduced pressure in the suction pipe of the engine as sensed by a suitable sensor may be used, as well as the hydraulic pressure representative of the operating amount of the accelerator pedal as indicated above.

It is also possible that the first pressure regulating valve 100 has additional pressure receiving area or areas.

It will be understood that the preferred embodiments of the invention and the modifications thereof which have been described above are provided for illustrative purpose, but the present invention may be embodied with various other changes and modifications, which may occur without departing from the spirit and scope of the invention defined in the following claims.

What is claimed is:

1. A hydraulic control device for controlling a belt-and-pulley type continuously variable transmission for an automotive vehicle which includes a first and second rotating shaft, a pair of variable-diameter pulleys provided on the first and second shafts, respectively, a transmission belt connecting the pair of pulleys, and a pair of hydraulic actuators for changing effective diameters of the variable-diameter pulleys, said hydraulic control device comprising:

a first and a second pressure regulating valve for adjusting a pressure of a working fluid supplied from a hydraulic power source, respectively to a first line pressure and a second line pressure which is lower than said first line pressure;

a first pressure line having said first line pressure;

a second pressure line having said second line pressure;

a CVT shift control valve device for controlling a speed ratio of said continuously variable transmission, said CVT shift control valve device including a shift-direction switching directional control valve and a shift-speed control flow control valve;

said directional control valve being operable between a second position in which a first of said pair of hydraulic actuators communicates with said first pressure line, while a second of said pair of hydraulic actuators communicates with said second pressure line, and a first position in which said first hydraulic actuator communicates with an atmosphere while said second hydraulic actuator communicates with said first pressure line; and said flow control valve controlling a rate of supply flow of the fluid into one of said first and said second hydraulic actuator and a rate of discharge flow of the fluid from the other of said second and first hydraulic actuators, in response to an operation of said directional control valve.

2. A hydraulic control device according to claim 1, wherein said directional control valve includes a spool valve having a valve spool axially movable between opposite stroke ends thereof which correspond to said first and second positions, said directional control valve further including a solenoid valve for controlling a pilot pressure applied to one of opposite axial ends of said valve spool and thereby moving said valve spool.

3. A hydraulic control device according to claim 1, wherein said flow control valve includes a spool valve having a valve spool axially movable between opposite stroke ends thereof, to control said rate of supply flow of the fluid into said one or other hydraulic actuator or said rate of discharge flow of the fluid from said other or one hydraulic actuator, said flow control valve further including a solenoid valve for controlling a pilot pressure applied to one of opposite axial ends of said valve spool and thereby moving said valve spool.

4. A hydraulic control device according to claim 1, further comprising a switch valve connected to a first hydraulic actuator of said pair of hydraulic actuators which is provided on said first rotating shaft, and to said second pressure line, said switch valve applying to said first pressure regulating valve one of a pressure in said first hydraulic actuator and said second line pressure, which one pressure is higher than the other,
and wherein
said first pressure regulating valve regulating said first line pressure such that said first line pressure is nigher than the pressure received from said switch valve, by a predetermined amount.

5. A hydraulic control device according to claim 4, wherein said first pressure regulating valve includes: a valve spool for connecting said first pressure line selectively to a third pressure line or a suction line, to thereby release the fluid from said first pressure line; and a spring for biasing said valve spool toward a closed position thereof, said valve spool having a first pressure receiving surface which receives said first line pressure to bias said valve spool toward an open position thereof, a second pressure receiving surface which receives said pressure supplied from said switch valve to bias said valve spool toward said closed position, and a third pressure receiving surface which receives a throttle pressure representative of an opening angle of a throttle valve of the vehicle, to bias said valve spool toward said closed position.

6. A hydraulic control device according to claim 4, wherein said switch valve includes a valve spool which is axially movable between a first position thereof for applying the pressure in said first hydraulic actuator to said first pressure regulating valve, and a second position thereof for applying said second line pressure to said first pressure regulating valve, said valve spool having a first pressure receiving surface which receives said pressure in said first hydraulic actuator to bias said valve spool toward said first position thereof, and a second pressure receiving surface which receives said second line pressure to bias said valve spool toward said second position thereof.

7. A hydraulic control device according to claim 6, wherein said switch valve further includes a spring for biasing said valve spool toward said second position thereof.

8. A hydraulic control device according to claim 1, further comprising a speed-ratio sensing valve for sensing an actual speed ratio of said continuously variable transmission and generating a speed-ratio pressure representative of said actual speed ratio, and a limit valve for limiting an increase in said speed-ratio pressure, and wherein
said second pressure regulating valve consists of a hydraulically operated pressure regulating valve which regulates said second line pressure, based on said speed-ratio pressure.

9. A hydraulic control device according to claim 8, wherein said limit valve limits said increase in said speed-ratio pressure, in relation to a currently required output of an engine of the vehicle.

10. A hydraulic control device according to claim 9, wherein said limit valve changes an upper limit of said speed-ratio pressure, based on a throttle pressure representative of an opening angle of a throttle valve of said engine.

11. A hydraulic control device according to claim 10, wherein said limit valve includes a valve spool for selective connection and disconnection of a fluid passage communicating with said speed ratio sensing valve, to and from a drain, and further includes a spring for biasing said valve spool toward a closed position thereof, a thrust based on said speed-ratio pressure acting on said valve spool in a direction toward an open positon thereof, while a thrust based on said throttle pressure acting on said valve spool in a direction toward said closed position thereof, said valve spool being moved toward said open position to thereby limit said increase in said speed-ratio pressure, when the thrust based on said speed-ratio pressure exceeds a sum of the thrust based on said throttle pressure and a thrust of said spring.

12. A hydraulic control device according to claim 1, wherein said pair of hydraulic actuators consist of a first and a second hydraulic actuator provided on said first and second rotating shafts, respectively, and said directional control valve comprises a first spool valve which is operable between a first position in which the fluid in said first pressure line is fed into said first hydraulic actuator while the fluid in said second hydraulic actuator is discharged into said second pressure line, and a second position in which the fluid in said first pressure line is fed into said second hydraulic actuator while the fluid in said first hydraulic actuator is discharged into said atmosphere, and wherein
said flow control valve comprises a second spool valve which has a first operating position in which the supply and discharge flows of the fluid into and from said first and second hydraulic actuators which are selected by said first spool valve are not restricted, a second operating position in which said supply and discharge flows are restricted, and a third position intermediate between said first and second positions,
said hydraulic control device further comprising:

a first solenoid which is turned on to place said first spool valve in said first position for increasing the speed ratio of the continuously variable transmission, and which is turned off to place the first spool valve in said second position for decreasing said speed ratio, and a second solenoid which is turned on to place said second spool valve in said first position for increasing a rate of change of said speed ratio, and which is turned off to place said second spool valve in said second position for decreasing said rate of change of said speed ratio.

13. A hydraulic control device according to claim 12, wherein said CVT shift control valve device further comprises:

a first solenoid valve which includes said first solenoid, and which produces a pilot pressure which is applied to a valve spool of said first spool valve to place the first spool valve in said second position when said first solenoid is off; and a second solenoid valve which includes said second solenoid, and which produces a pilot pressure which is applied to a valve spool of said second spool valve to place the second spool valve in said second position when said second solenoid is off.

14. A hydraulic control device according to claim 1, further comprising:

a by-pass passage which connects one of said pair of hydraulic actuators and said second pressure line and which includes a restrictor; and a check valve provided in said by-pass passage, said check valve permitting a flow of the fluid through said by-pass passage in a direction toward said one hydraulic actuator while inhibiting a flow of the fluid through said by-pass passage in a direction toward said second pressure line.

15. A hydraulic control device according to claim 1, wherein said flow control valve includes a valve housing having a cylindrical bore and a plurality of ports formed therein, and a valve spool slidably received in said cylindrical bore for controlling said rates of supply and discharge flows of the fluid, said valve spool including a plurality of lands for opening and closing said ports, one of said valve housing and each of said lands having at least one cutout for permitting a gradual change in said rates of supply and discharge flows of the fluid through said ports as said valve spool is axially moved.

16. A hydraulic control device according to claim 15, wherein said at least one cutout is selected from a group consisting of a tapered end portion of said each land, at least one V-shaped notch formed in said each land, and a stepped cutout formed in said each land.

17. A hydraulic control device according to claim 15, wherein said at least one cutout is selected from a group consisting of at least one tapered notch, at least one V-shaped notch and a stepped cutout which are formed in a portion of an inner circumferential surface of said cylindrical bore which slidably engages said each land.

18. A hydraulic control device according to claim 1, wherein the fluid in said first pressure line is fed into said one hydraulic actuator and the fluid in said other hydraulic actuator is discharged into said second pressure line, while a third pressure line is provided for purposes which include lubrication of a power transmitting system which includes said continuously variable transmission, said second pressure line being provided downstream of said first pressure line, said third pressure line being provided downstream of said first pressure line and in parallel with said second pressure line, said third pressure line having a third line pressure, said hydraulic control device further comprising:

a third pressure regulating valve for establishing said third line pressure such that said third line pressure is lower than said first line pressure.

19. A hydraulic control device according to claim 18, wherein said first pressure regulating valve consists of a pressure relief type pressure regulating valve which releases the fluid from said first pressure line into said third pressure line, and said second pressure regulating valve consists of a pressure reducing type pressure regulating valve which reduces said first line pressure to said second line pressure, said third pressure regulating valve consisting of a pressure relief type pressure regulating valve which releases the fluid from said third pressure line into a drain.

20. A hydraulic control device according to claim 18, wherein said first pressure regulating valve adjusts said first line pressure, based on a pressure which represents a currently required output of the vehicle, and a higher one of said second line pressure and a pressure in a first hydraulic actuator of said pair of hydraulic actuators which is provided on said first rotating shaft, such that said pair of hydraulic actuators have a thrust ratio that permits an actual speed ratio of said continuously variable transmission to coincide with a determined target speed ratio.

21. A hydraulic control device according to claim 18, wherein said second pressure regulating valve adjusts said second line pressure, based on a currently required output of the vehicle and a speed ratio of the continuously variable transmission, such that said transmission belt has a minimum tension required to transmit a torque that is required to provide said currently required output.

22. A hydraulic control device according to claim 21, wherein said second pressure regulating valve consists of a hydraulically operated pressure regulating valve which adjusts said second line pressure, based on a pressure representative of said currently required output of the vehicle and a pressure representative of the speed ratio of the continuously variable transmission.

23. A hydraulic control device according to claim 21, wherein said second pressure regulating valve consists of a pressure regulating servo valve which is electrically controlled based on a signal representative of said currently required output of the vehicle and a signal representataive of the speed ratio of the continuously variable transmission.

24. A hydraulic control device according to claim 18, wherein said third pressure regulating valve operates to maintain said third line pressure at a predetermined constant level.

25. A hydraulic control device according to claim 1, wherein said first pressure regulating valve includes a valve spool which is movable in a pressure-increasing direction to increase said first line pressure, and in a pressure-decreasing direction to decrease said first line pressure, said valve spool having a first pressure receiving surface which receives said first line pressure to produce a first thrust for biasing said valve spool in said pressure-decreasing direction, and a second pressure receiving surface which receives a highest one of pressures in said pair of hydraulic actuators and said second line pressure, to produce a second thrust for biasing said valve spool in said pressure-increasing direction.

26. A hydraulic control device according to claim 25, wherein said first pressure regulating valve further has a third pressure receiving surface which receives a pressure representative of a currently required output of an engine of the vehicle, to produce a third thrust for biasing said valve spool in said pressure-increasing direction, said first pressure regulating valve further including a return spring for producing a fourth thrust for biasing said valve spool in said pressure-increasing direction, said first line pressure being determined by an equilibrium position of said valve spool in which said first thrust is balanced with a sum of said second, third and fourth thrusts.

27. A hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, a first line pressure and a second line pressure being applied to one and the other of said pair of hydraulic actuators, respectively, so as to control a speed ratio of said continuously variable transmission, said hydraulic control device comprising:
 a first pressure line having said first line pressure;
 a second pressure line having said second line pressure;
 a switch valve connected to a first hydraulic actuator of said pair of hydraulic actuators which is provided on said first rotating shaft, and to said second pressure line, said switch valve generating as an output pressure thereof a higher one of a pressure in said first hydraulic actuator and said second line pressure; and
 a first pressure regulating valve for adjusting said first line pressure such that said first line pressure is higher than said output pressure by a predetermined amount.

28. A hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, a first line pressure and a second line pressure being applied to one and the other of said pair of hydraulic actuators, respectively, so as to control a speed ratio of said continuously variable transmission, said hydraulic control device comprising:
 a first pressure line having said first line pressure;
 a second pressure line having said second line pressure, for establishing an optimum tension of said transmission belt;
 a speed-ratio sensing valve for sensing an actual speed ratio of said continuously variable transmission and generating a speed-ratio pressure representative of said actual speed ratio;
 a hydraulically operated pressure regulating valve for regulating said second line pressure, based on said speed-ratio pressure, such that said second line pressure decreases with an increase in said actual speed ratio of said transmission; and
 a limit valve for limiting an increase in said speed-ratio pressure of said speed-ratio sensing valve, so that a decrease in said second line pressure is limited when said actual speed ratio of said transmission exceeds a predetermined limit.

29. A hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, a working fluid in a first pressure line being fed into one of said pair of actuators and the fluid in the other hydraulic actuator being discharged into a second pressure line, while a third pressure line is provided for purposes which include lubrication of a power transmission system which includes said continuously variable transmission, said hydraulic control device comprising:
 a first pressure regulating valve for regulating a first line pressure which is applied to said one hydraulic actuator through said first pressure line;
 a second pressure regulating valve provided downstream of said first pressure regulating valve, said second pressure regulating valve regulating a second line pressure in said second pressure line, for establishing an optimum tension of said transmission belt, based on an actual speed ratio of said continuously variable transmission and a required amount of torque transmitted by said transmission, such that said second line pressure is lower than said first line pressure and decreases with a decrease in said required amount of torque; and
 a third pressure regulating valve provided downstream of said first pressure regulating valve and in parallel with said second pressure regulating valve, said third pressure regulating valve regulating a third line pressure in said third pressure line such that said third line pressure is lower than said first line pressure.

30. A hydraulic control device for controlling a belt-and-pulley type continuously variable transmission for an automotive vehicle which includes a first and a second rotating shaft, a pair of variable-diameter pulleys provided on the first and second shafts, respectively, a transmission belt connecting the pair of pulleys, and a pair of hydraulic actuators for changing effective diameters of the variable-diameter pulleys, said hydraulic control device comprising:
 a first pressure line having a first line pressure;
 a second pressure line having a second line pressure;
 a CVT shift control valve device for controlling a speed ratio of said continuously variable transmission, such that a working fluid in said first pressure line is fed into one of said pair of hydraulic actuators while the fluid in the other hydraulic actuator is discharged into said second pressure line;
 a pressure regulating valve including a valve spool which is movable in a pressure-increasing direction to increase said first line pressure, and in a pressure-decreasing direction to decrease said first line pressure; and
 said valve spool having a first pressure receiving surface which receives said first line pressure to produce a first thrust for biasing said valve spool in said pressure-decreasing direction, and a second pressure receiving surface which receives a highest one of a pressure in said one of the hydraulic actuators and said second line pressure, to produce a second thrust for biasing said valve spool in said pressure-increasing direction, said second pressure receiving surface having an area smaller than that of said first pressure receiving surface.

* * * * *